US010974720B2

United States Patent
Kingman

(10) Patent No.: US 10,974,720 B2
(45) Date of Patent: Apr. 13, 2021

(54) VEHICLE SLIDING BUMPER AND SYSTEM FOR OBJECT CONTACT DETECTION AND RESPONSIVE CONTROL

(71) Applicant: Connor Kingman, Lemoore, CA (US)

(72) Inventor: Connor Kingman, Lemoore, CA (US)

(73) Assignee: Kingman Ag, LLC, Lemoore, CA (US)

( * ) Notice: Subject to any disclaimer, the term of this patent is extended or adjusted under 35 U.S.C. 154(b) by 224 days.

(21) Appl. No.: 16/107,411

(22) Filed: Aug. 21, 2018

(65) Prior Publication Data

US 2020/0079362 A1    Mar. 12, 2020

Related U.S. Application Data

(60) Provisional application No. 62/718,063, filed on Aug. 13, 2018.

(51) Int. Cl.
| | |
|---|---|
| *B60W 30/09* | (2012.01) |
| *B60R 19/02* | (2006.01) |
| *G05D 1/02* | (2020.01) |
| *B60R 19/48* | (2006.01) |

(52) U.S. Cl.
CPC .......... *B60W 30/09* (2013.01); *B60R 19/023* (2013.01); *B60R 19/483* (2013.01); *G05D 1/0227* (2013.01); *B60W 2554/00* (2020.02); *G05D 2201/0201* (2013.01)

(58) Field of Classification Search
CPC . B60W 30/09; B60W 2554/00; B60R 19/023; B60R 19/483; G05D 1/0227; G05D 2201/0201
See application file for complete search history.

(56) References Cited

U.S. PATENT DOCUMENTS

| | | | |
|---|---|---|---|
| 1,504,505 A | 8/1924 | Reed et al. | |
| 1,682,731 A | 9/1928 | Austin | |
| 3,752,250 A | 8/1973 | Speer | |

(Continued)

FOREIGN PATENT DOCUMENTS

| | | | |
|---|---|---|---|
| CN | 202703475 U | * | 1/2013 |
| DE | 102014106692 A1 | | 12/2014 |

OTHER PUBLICATIONS

EPO and Google, Description CN202703475, Yuan (Year: 2013).*

(Continued)

*Primary Examiner* — Hunter B Lonsberry
*Assistant Examiner* — Elizabeth Yang
(74) *Attorney, Agent, or Firm* — Richard A. Ryan

(57) ABSTRACT

A sliding bumper apparatus and system for use with a motor vehicle to prevent the vehicle from making contact with objects that can result in damage and/or injury. A frame of the apparatus attaches to the vehicle to extend outward from the vehicle. A pair of elongated indicator rods are slidably supported by the frame. Transversely positioned detector rods are pivotally connected to the distal end of the apparatus to contact objects in the path ahead of the moving vehicle. A switch at the proximal end of the apparatus is engaged by sliding movement of the indicator rods. A spring biases the switch to a closed position to allow movement of the vehicle. If the apparatus contacts an object that should not be hit by the vehicle, the impact force will overcome the spring and open the switch to stop the vehicle before it hits the object.

20 Claims, 6 Drawing Sheets

(56) References Cited

U.S. PATENT DOCUMENTS

| | | |
|---|---|---|
| 4,541,661 A | 9/1985 | Hawk |
| 5,211,115 A | 5/1993 | Maier et al. |
| 5,626,376 A | 5/1997 | Parker |
| 6,158,556 A | 12/2000 | Swierczewski |
| 6,974,166 B2 | 12/2005 | Ledford et al. |
| 7,416,210 B2 | 8/2008 | Roelleke |
| 8,731,815 B2 | 5/2014 | Cummings |
| 9,403,499 B2 | 8/2016 | Hicks |
| 9,663,053 B2 | 5/2017 | Saitoh et al. |
| 9,994,219 B2 | 6/2018 | Nilsson et al. |
| 10,007,269 B1 | 6/2018 | Gray |
| 10,035,483 B2 | 7/2018 | Wylezinski et al. |
| 10,037,033 B2 | 7/2018 | Yako et al. |
| 10,463,212 B2* | 11/2019 | Nam ............... A47L 9/1633 |
| 2001/0033094 A1* | 10/2001 | Sano ............... B62D 21/15 296/203.02 |
| 2005/0039428 A1* | 2/2005 | McMurtry ........ A01B 69/008 56/1 |
| 2005/0154530 A1* | 7/2005 | Hosokawa ........ B60R 21/013 701/301 |
| 2006/0113122 A1 | 6/2006 | Persson |
| 2008/0133052 A1* | 6/2008 | Jones ............... G05D 1/0088 700/245 |
| 2010/0300059 A1* | 12/2010 | Haws ............... A01D 45/007 56/327.2 |
| 2015/0081156 A1 | 3/2015 | Trepagnier et al. |
| 2017/0016758 A1 | 1/2017 | Salzgeber |
| 2019/0225171 A1* | 7/2019 | Temple ............ B60R 19/40 |

OTHER PUBLICATIONS

Patent Cooperation Treaty, Notification of Transmittal of the International Search Report and the Written Opinion of the International Searching Authority, or the Declaration, dated Jun. 17, 2020, 1 page, PCT, US.

Patent Cooperation Treaty, International Search Report, dated Jun. 17, 2020, 3 pages, PCT, US.

Patent Cooperation Treaty, Written Opinion of the International Searching Authority, dated Jun. 17, 2020, 9 pages, PCT, US.

* cited by examiner

VEHICLE SLIDING BUMPER AND SYSTEM FOR OBJECT CONTACT DETECTION AND RESPONSIVE CONTROL

CROSS-REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to apparatuses and systems that are utilized with motorized vehicles to avoid or reduce damage to the vehicle, occupants of the vehicle and/or an object as a result of the vehicle making contact with the object. Specifically, the present invention relates to such apparatuses and systems that are utilized with motor vehicles to allow the vehicle to detect contact with an object while the vehicle is moving and to cause the vehicle to take proper action after such contact. More specifically, the present invention relates to such apparatuses and systems that are utilized with a motor vehicle to beneficially control the operation of the vehicle if the vehicle makes contact with a potentially damaging object in order to prevent or reduce the amount of damage to the vehicle, occupants of the vehicle and/or object.

B. Background

Throughout the world, there are a wide variety of different types of motor vehicles that are utilized for accomplishing a wide variety of tasks, most of which involve transporting people, carrying equipment, supplies, materials and a wide variety of other articles and/or moving other vehicles or equipment, typically by towing or pushing. Motor vehicles generally have many common components that are used to move or allow the vehicle to move on a freeway, highway, street, road, ground or other surface. Despite the common components, motor vehicles differ substantially in the arrangement and operation of the components depending on whether the vehicle is an automobile, truck, motorcycle, tractor, harvesting machine or the like. Until very recently, nearly all motor vehicles required a driver or other human operator to be on or inside the vehicle in order to control the movement of the vehicle by manually operating all of the devices and mechanisms that cause the vehicle to start, move, stop and to drive in the desired direction. The use, configuration and operation of these operator-controlled devices and mechanisms are generally well known to persons who are skilled in the art.

More recently, there has been an increase in the development of motor vehicles that do not require a driver or operator to control the operation and movement of the vehicle. Some of the non-driver/operator vehicles are commonly referred to as remote-controlled vehicles and others are commonly referred to as autonomous vehicles. As generally known to persons skilled in the relevant art, the operation and movement of a remote-controlled motor vehicle is fully controlled by a person who is located remotely, sometimes very remotely, from the vehicle. In contrast, autonomous vehicles are configured to operate and move on their own, without any direct control by a person in the vehicle or outside of the vehicle. In a common configuration, both types of motor vehicles have equipment and systems, such as cameras, computers and the like, that are utilized to analyze the area around the vehicle and control operating components of the vehicle to start, stop and move the vehicle. With regard to remote-controlled motor vehicles, the equipment and systems thereof allow the remotely located person to see and analyze the vehicle surroundings to make decisions regarding the operation and movement of the vehicle. With regard to autonomous motor vehicles, the equipment and systems thereof allow the motor vehicle to visualize and analyze the vehicle surroundings to make decisions regarding the operation and movement of the vehicle based on the data the equipment and systems receive and process. In general, an autonomous vehicle uses on-board computers to process data from the vehicle (i.e., speed, direction and the like), cameras and other associated equipment to determine whether it is safe or not for the vehicle to move or continue moving in a particular direction. As such, the safe and effective operation of an autonomous vehicle is highly dependent on the selection and configuration of the cameras, computers and other equipment that control the speed, braking and directional movement of the vehicle.

As is readily appreciated by anyone who owns, drives or rides in a motor vehicle, two of the most important functions of the various components and systems of the vehicle are those components and systems which are related to the ability of the vehicle to stop or otherwise avoid a collision and those that are related to the ability of the vehicle occupants and vehicle to survive a collision if it occurs. For the typical driver/operated vehicle, collision avoidance relies on the driver or operator paying attention to where he or she is directing the vehicle, operating at a safe speed for the conditions of the surface on which the vehicle is moving and properly functioning brakes and the other components of the vehicle's braking system. Assuming all of the components and systems are operating properly, when the driver/operator of a motor vehicle sees an object in the vehicle's path, he or she merely has to place sufficient pressure on a brake peddle or otherwise engage the braking system in sufficient time to slow down or stop the vehicle before the vehicle collides with an object in its path. If the components and systems are not working properly or the driver/operator fails to take the appropriate action in sufficient time to stop or avoid the object, which can happen even if the driver/operator is paying attention to where the vehicle is going, then the vehicle will likely collide with the object. As well known in the relevant art, a collision with an object can harm the driver/operator and other occupants of the motor vehicle, damage the motor vehicle and/or harm or damage the object. In fact, depending on a number of factors, the collision can cause serious injuries to or even kill the occupants of the motor vehicle and/or extensively damage the motor vehicle and/or object (or harm/kill the object if the object is a person or an animal).

Remote-controlled motor vehicles generally have the same benefits and constraints as driver/operator operated vehicles with regard to avoiding a collision, except the driver/operator cannot be injured or killed in a collision due to his or her remote location. Collision avoidance requires the driver/operator of a remote-controlled motor vehicle to pay attention to the vehicle's path and then operate the remote control mechanism to cause the vehicle to slow or stop before the vehicle collides with an object in the vehicle's path. One well known problem with remote-controlled motor vehicles is that the vehicle must be in and remain in electronic communication with the remotely located person during the entire time the vehicle is or will be in motion. In addition, it would be difficult for one person to effectively and safely control more than one vehicle at a time, which severely limits the applications in which remote-controlled vehicles can be utilized.

In contrast to driver/operated or remote-controlled motor vehicles, an autonomous motor vehicle entirely relies on the on-board equipment and systems thereof to make a determination as to whether there is an object in the direction of travel that requires the motor vehicle to slow, stop or take evasive action to avoid a collision. The on-board equipment and systems track the speed, direction and other movement data of the vehicle, "see" or visualize an object (typically with a camera, radar, LIDAR or the like) in the vehicle's path, transmits the visual data to a computer having an algorithm that processes the movement data and visual data to determine whether the object presents a collision damage problem or not and then transmits commands (instructions) from the computer to the vehicle's braking and/or directional (i.e., steering) systems to take the required action to avoid a collision with the object. As will be readily appreciated by persons who are familiar with the use and operation of autonomous vehicles, none of the requirements for safely navigating a freeway, highway, street, road or other surface are particularly easy to accomplish. For instance, an autonomous vehicle must have one or more object data gathering devices (camera, radar, LIDAR or the like) configured to be able to sufficiently see or visualize objects in the vehicle's path with enough clarity for the computer's algorithm to determine what the object is and whether or not hitting the object presents a danger to the object, the motor vehicle or persons or items inside the vehicle (i.e., whether the object is grass or weeds versus a person or animal in the path). The computer must be configured to receive and process the data with sufficient speed and accuracy to allow commands to be sent to the braking and/or steering systems to slow, stop or take evasive action before the vehicle hits the object. The braking and steering systems must be configured to respond to commands from the computer. In addition to the above, the equipment and systems must also be configured to determine when the object has moved, such as person or animal moving across a street, and it is safe for the motor vehicle to move again.

To accomplish the above tasks, the computer control systems of an autonomous vehicle utilize one or more algorithms to make decisions about the object and what action should or should not be taken by the vehicle in response to the object. The algorithm utilized by an autonomous vehicle must be configured with a base amount of "knowledge" and the ability to "learn" with regard to what objects can be harmed by the vehicle or damage the vehicle and, possibly, harm the occupants thereof, so the system will operate the vehicle in a manner that avoids colliding with such objects. As well known, however, there have been and generally continue to be significant problems with regard to being able to develop the necessary equipment and systems to safely move an autonomous vehicle on a surface where there may be other vehicles, pedestrians, animals and/or other objects. In fact, to the best of the inventor's present knowledge, the issues of safe operation of autonomous vehicles have not been fully solved.

For an autonomous vehicle to be successful, the equipment and systems of such a vehicle must be configured with a collision avoidance system, including hardware and software, that accomplishes the goals and solves the problems set forth above. Such objectives have been the subject of a number of previous patents. For instance, U.S. Pat. No. 9,994,219 to Nilsson, et al. discloses a device and method for safely stopping an autonomous road vehicle comprising a system and sensors for monitoring the vehicle's surroundings and motion and a signal processing system for processing sensor signals. Among other tasks, a processor is utilized to continuously predict where drivable space exists and calculates a safe trajectory to stop within the drivable space. U.S. Pat. No. 10,007,269 to Gray discloses a collision-avoidance system for autonomous-capable vehicles that continually receives image frames captured from the road or other surface to determine a drivable space in a forward direction of the vehicle. The system is configured to determine, for each frame, whether individual regions of the image frame depict drivable space. U.S. Pat. No. 10,037,033 to Yako, et al. discloses a vehicle exterior surface object detection system for autonomous vehicles having at least one sensor programmed to output environmental signals representing an environment around the vehicle and object detection signals that represent an object or person that may be on or against an exterior surface of the vehicle.

For all types of vehicles, whether human operated, remote-controlled or autonomous, there usually are systems to detect a collision with an object and to absorb or deflect the object in a manner which reduces the likelihood of or at least the extent of damage to the motor vehicle. As an example, bumper apparatuses and systems have been developed for motor vehicles to reduce the amount of damage to the vehicle when the vehicle contacts an object, particularly with regard to low speed crashes. In addition, apparatuses and systems have been developed that are utilized to detect contact with an object and to take action based on the extent of that contact, such as the technology utilized to activate an interior compartment air bag and the like. An example of one such prior art apparatus and system is set forth in U.S. Pat. No. 9,663,053 to Saitoh, et al., which discloses a collision detection device for a vehicle that comprises a chamber member on the front side of a bumper, a pressure sensor to detect pressure in a hollow portion of the chamber, an electronic control unit that detects a collision based on the pressure sensor and a projection portion that is in contact with a front surface of the bumper reinforcement component of the bumper cover. U.S. Pat. No. 6,158,556 to Swierczewski discloses a vehicle safety mechanism for dissipating collision forces that comprises two larger friction platforms beneath the vehicle, an actuator between each of the platforms and the vehicle frame and series of struts or arms that connect the platforms to the vehicle to minimize impact forces between the vehicle and the impacted object. U.S. Pat. No. 6,974,166 to Ledford, et al. discloses an adjustable safety bumper that comprises housings mounted to the frame of a vehicle by vertically extending members that position the housings to absorb impact during a collision to avoid damage to the bumper. U.S. Pat. No. 9,403,499 to Hicks discloses an energy absorbent slider stop and rear underride protection system for use with trailers when backing against a delivery dock or the like. The apparatus comprises a slider suspension arrangement that is coupled to the frame of the vehicle and an impact force absorbing arrangement, part of which is configured to elastically deform when impacted. U.S. Pat. No. 7,416,210 to Roelleke discloses a method and device for controlling the triggering of a passive safety system, such as airbags and the like utilized in vehicles in response to an impact force.

One area of technology that is beginning to see potential for the use of autonomous and remote-controlled vehicles is in farming and related agricultural operations. As well known to persons who are skilled in the agricultural industry, certain types of motor vehicles are beneficially utilized to prepare the land for planting, plant crops, maintain and treat the field and plants while the plants are growing and/or crops are growing on the plants, harvest the crops from the field or plants and clear the field after harvesting. Such motor vehicles include, but are not limited to, tractors, self-propelled (non-towed) mechanical harvesters and the like. Currently, such motor vehicles require a driver or operator to operatively control the vehicle from inside or on the vehicle as the vehicle moves through the field in the paths between rows of plants (i.e., row crops, vines, bushes, trees and the like) that will become or produce the crop which is desired by the agricultural process. As well known to persons who are skilled in the art, as the driver/operator moves the vehicle through the agricultural field to do the desired field/plant work, he or she must direct the vehicle along the path without damaging the plants, plant supports (such as trellises or the like), irrigation equipment and pipes, and a wide variety of other equipment that may be located near the path. Although the path should be clear of obstacles, occasionally some equipment or materials are inadvertently left in the path and, as a result, can interfere with the movement of the vehicle through the field. In addition, there may be pipes, stakes, poles and other obstacles near the path which the vehicle could collide with if not operated carefully.

As stated above, typically a driver/operator is utilized to move the agricultural vehicle through a field and he or she will control the vehicle in a manner to avoid any obstacles. For remote-controlled use of such vehicles, the remotely located operator would have to be able to view the path and have sufficient control over the vehicle to stop the vehicle if an obstacle is encountered. An autonomous agricultural vehicle has to be able to utilize the on-board equipment and systems to determine which objects are safe to drive over or collide with, such as grass, weeds, branches and the like, and which objects are not, such as pipes, plants, irrigation manifolds, poles and the like. Cameras, radar and LIDAR systems that are connected to a computer control system, including algorithms to determine what the cameras/radar/LIDAR are seeing, can be utilized to direct the vehicle along the path between the rows of plants and to guide the vehicle from one row to the next. As with conventional autonomous vehicles, a major obstacle to being able to safely and effectively utilize autonomous vehicles in an agricultural field is the ability to stop the vehicle when in encounters an object in sufficient time that the vehicle does not contact and, likely, destroy the object. Unlike conventional autonomous vehicles, however, agricultural areas have a mix of objects that are safe to run over or hit and objects that are not. More specifically, with all of the potential obstacles in an agricultural area, it is difficult for camera, radar, LIDAR and computer systems to provide sufficient information to the braking system to either prevent the vehicle from making contact with objects that should not be contacted and to prevent the vehicle from stopping when it should not stop. The inability of the equipment and systems to stop or not stop a motor vehicle upon contact with an object, depending on the object, in an agricultural field has heretofore been a major impediment to use of autonomous motor vehicles in the agricultural industry.

Despite the advances in remote-controlled and autonomous vehicles and the ability of such vehicles, as well as driver/operator operated vehicles, to either avoid or absorb contact with an object, the various apparatuses and systems do not provide a solution that is able to be utilized in areas which have objects that are safe for the vehicle to contact (or run over) and objects which are not safe for such contact. What is needed, therefore, is an improved apparatus and system for use with vehicles that will slow and stop a vehicle before it can damage an object or be damaged by the object. More specifically, what is needed is an improved apparatus and system that will stop a vehicle before it makes contact with objects that will be damaged by such contact. The new apparatus and system should be structured and arranged to allow a vehicle to continue moving along its designated path if the vehicle makes contact with objects that are not likely to cause damage or injury and to stop the vehicle prior to the vehicle making contact with the object if such contact will cause damage to vehicle and/or damage or harm the object. Although the improved apparatus and system for avoiding undesirable contact and allowing non-harmful contact between a motor vehicle and an object should be suitable for use with a wide range of types of motor vehicles, the apparatus and system should be particularly useful in agricultural areas to allow autonomous agricultural vehicles to operate in a field having paths between rows of plants. Such an apparatus and system for use in agricultural fields should be configured to allow the motor vehicle to operate as quickly and efficiently as possible and in a manner that prevents damage to equipment and plants in the field so as to facilitate the commercial cultivation of crops. Preferably, the new apparatus and system should be easy to install and use and relatively inexpensive to manufacture.

SUMMARY OF THE INVENTION

The apparatus and system of the present invention provides the benefits and solves the problems identified above. That is to say, the present invention discloses a vehicle sliding bumper and system utilizing such bumper for use with motor vehicles to detect contact with an object and responsively control the vehicle so as to reduce or eliminate damage or harm to the vehicle, to any occupants of the vehicle and to the object. More specifically, the new apparatus and system of the present invention can be utilized with a motor vehicle, by being attached to or being integrally formed therewith, to detect contact with an object in a manner that allows the vehicle to slow and stop before the motor vehicle contacts the object, thereby avoiding damage or harm to the vehicle, occupants and object. Even more specifically, the new apparatus and system are structured and arranged to allow a motor vehicle to continue moving along its designated path if the vehicle makes contact with an object that is not likely to cause damage or injury to the vehicle, occupants and object, and to stop the vehicle prior to the vehicle making contact with the object if such contact will cause damage or injury to the vehicle, occupants and/or the object. The apparatus and system of the present invention can be utilized with all types of motor vehicles, including driver/operator operated vehicles, remote-controlled vehicles and autonomous vehicles, to avoid damaging and/or harmful contact with an object and allow non-harmful contact with an object. When utilized with an autonomous vehicle, the apparatus and system will allow the vehicle to operate as quickly and efficiently as possible while avoiding harmful contact with objects. In one configuration, the new apparatus and system are particularly useful in the agricultural industry to allow autonomous agricultural vehicles to operate in a field having paths between rows of plants in a manner that prevents damage to equipment, persons and plants in the field to facilitate the commercial cultivation of crops. In the preferred embodiments, the apparatus and system of the present invention is easy to install and use and relatively inexpensive to manufacture.

One embodiment of utilizing the new apparatus and system is in the agricultural industry to assist growers and others with preparation, maintenance, harvesting and removal operations. For purposes of describing the configuration and use of the present invention and the related prior art with regard to use of the apparatus and system with a motor vehicle in the agricultural industry, the term "plant" is utilized herein to collectively refer to any type of row crop, vine, tree, bush or the like, the term "crop" is utilized herein to collectively refer to any beneficial product that is produced by a plant and the term "agricultural area" is utilized herein to collectively refer to a field, vineyard, orchard or any other area that is utilized to grow plants to produce crops. While describing the present invention or the related prior art, reference may be made to certain specific types of plants, crops and/or growing areas in order to describe the attributes of the new apparatus and system for use in agricultural areas and/or to better explain the prior art. Persons skilled in the art, however, will realize these same attributes are also relevant to other types of plants, crops or growing areas.

In one embodiment of the present invention, the bumper apparatus generally comprises a support frame, a contact indicator device and a contact detection device that are cooperatively configured and arranged to detect contact with an object, determine if the object can be hit or run over by the motor vehicle and stop the motor vehicle if the object is of the type that should not be hit or run over by the motor vehicle. The support frame has one or more frame members that define a first end and a second end of the support frame. The first end of the support frame defines a proximal end of the bumper apparatus. The proximal end of the apparatus is structured and arranged to be integral with or attached to the motor vehicle so as to be positioned with the second end of the support frame disposed in a direction of travel of the motor vehicle as it moves along a path having objects thereon which can be or should not be hit or run over by the motor vehicle. In one configuration, the apparatus has a clamping mechanism for securely clamping the support frame of the bumper apparatus to the motor vehicle so as to extend a distal end of support frame outward from the motor vehicle in the direction of travel of the motor vehicle. The clamping mechanism can be structured and arranged to clamp the support frame of the bumper apparatus onto a bumper, such as the front bumper, of the motor vehicle.

The contact indicator device comprises a pair of spaced apart elongated indicator rods, one or more rod supports that are associated with each of the indicator rods and a switching mechanism that is associated with each of the indicator rods. The rod supports are attached to or integral with the support frame and are configured to slidably support one the indicator rods on or near a first side of the bumper apparatus and the other indicator rod on or near a second side of the bumper apparatus. Both of the indicator rods extend outward from the motor vehicle in the direction of travel of the motor vehicle. The switching mechanism is structured and arranged to move between a closed position and an open position in response to sliding movement of the one of the indicator rods. The switching mechanism is operatively connected to the braking system of the motor vehicle so as to stop the motor vehicle from continuing to move in the direction of travel when the switching mechanism is placed in one of the closed position and the open position. The contact indicator device is configured to determine if an object is of a first type object that the motor vehicle should not contact or of a second type object that can be contacted by the motor vehicle. The contact indicator device will stop the motor vehicle if the object is the first object type and allow movement of the motor vehicle in the direction of travel if the object is the second object type.

The contact detection device comprises one or more elongated detector rods that are structured and arranged to contact the object in the path of the motor vehicle. Each of the detector rods are positioned transverse to the direction of travel of the motor vehicle and are attached to at least one of the indicator rods so as to be in spaced apart relation to the second end of the support frame and to the motor vehicle in the direction of travel of the motor vehicle. The detector rods are sufficiently positioned ahead of the motor vehicle so a detector rod will contact the object sufficiently prior to the motor vehicle reaching the object to allow the switching mechanism to stop the motor vehicle prior to the motor vehicle contacting the object if the object is the first type object. If the object is of the second object type, the motor vehicle will be allowed to continue moving in its direction of travel and hit or run over the object.

In one of the preferred configurations, the switching mechanism is configured to stop the motor vehicle when it is placed in the open position. In this configuration, the switching mechanism comprises a support plate that is attached to or integral with each of the pair of indicator rods at or near the proximal end of the bumper apparatus. The support plate is configured to be moved in spaced apart relation to the proximal end of the apparatus by the sliding movement of one of the indicator rods to place the switching mechanism in the open position and stop the motor vehicle. A preferred embodiment of the bumper apparatus has a biasing mechanism, such as a spring, that is operatively connected to the switching means to biasing the switching mechanism between one of the open position and the closed position. The spring can be connected to a bracket that is attached to or integral with the support frame to bias the switching mechanism between the open position and the closed position. Typically, the biasing mechanism will be structured and arranged to bias the switching mechanism in the closed position to allow movement of the motor vehicle when the contact detection device of the new bumper apparatus contacts a second type of object and to allow the switching mechanism to move to the open position when the contact detection device contacts the first type of object so as to stop the motor vehicle. The switching mechanism is typically connected to an actuator device that is operatively connected to the braking system of the motor vehicle so as to activate the braking system and stop the motor vehicle when the bumper apparatus contacts the first object type. In one use, the new bumper apparatus can be utilized with a motor vehicle having one or more data gathering devices, one or more control connecting devices and a computer that is operatively connected to each of the data gathering devices and control connecting devices to allow the motor vehicle (with the bumper apparatus) to be autonomously operated in a manner that significantly reduces the likelihood of contacting objects that can cause damage or injury.

In a preferred configuration, each of the detector rods of the contact detection device are pivotally attached to the indicator rods. In one embodiment, the contact detection device comprises two axially aligned detector rods, with one of the detector rods being attached to or integral with each of the indicator rods so as to slidably move the respective indicator rod if one of a detector rod contacts an object of the first object type so as to engage the switching mechanism and stop the motor vehicle. In this embodiment, the bumper apparatus also has a pivoting mechanism interconnecting one of the detector rods and one of the indicator rods to allow the detector rods to pivot relative to the indicator rods upon contact with the first object type so as to push the indicator rods inward toward the motor vehicle and cause the switching mechanism to open and stop the movement of the motor vehicle. This embodiment can also include a bump stop that is associated with each of the detector rods, with the bump stop comprising at least one rod mount attached to or integral with each of the detector rods and a connecting rod interconnecting the rod mounts on each of the detector rods so as to better direct the indicator rods toward the motor vehicle upon contact with an object of the first object type by the detector rods.

Accordingly, the primary objective of the present invention is to provide an object collision detection and avoidance apparatus and system for use with motor vehicles that has the benefits described above and elsewhere herein and which overcomes the limitations and problems that are associated with currently available apparatuses and systems for detecting the presence of an object and avoiding damaging contact between the vehicle and the object.

It is a primary objective of the present invention to provide an apparatus and system for use with motor vehicles that can detect contact with an object in the path of the vehicle, determine if the contact with the object is likely to harm the vehicle, occupants of the vehicle and/or the object and then cause the vehicle to take or not take action depending on the determination whether such contact will be harmful or not.

It is also an object of the present invention to provide an apparatus and system for use with motor vehicles that are specially configured for use in the agricultural industry so as to allow improved operations of the vehicles, including driver/operator operated vehicles, remote-controlled vehicles and autonomous vehicles, to prepare an agricultural area, plant plants in the agricultural area, maintain the agricultural area and/or the plants, harvest crops and remove any waste materials.

An important aspect of the present invention is that it provides a new object collision detection and avoidance apparatus and system for use with motor vehicles which achieves the goals of the above-described objectives.

Another important aspect of the present invention is that it provides a new apparatus and system for use with motor vehicles which are structured and arranged to identify if the vehicle contacts an object in the path of the vehicle and to control the operation of the vehicle to stop the vehicle before it collides with the object.

An important aspect of the present invention is that it provides a new apparatus and system for use with motor vehicles which are structured and arranged to engage an object that is in the path of the vehicle and from such engagement determine whether the object can be safely hit or run over by the vehicle or whether the vehicle should stop before colliding with the object.

An important aspect of the present invention is that it provides a new vehicle sliding bumper apparatus and system for use with motor vehicles which are structured and arranged to detect contact with an object and responsively control the vehicle so as to reduce or eliminate damage or harm to the vehicle, to any occupants of the vehicle and to the object if the object cannot be safely hit and/or run over by the vehicle.

An important aspect of the present invention is that it provides a new vehicle sliding bumper apparatus and system for use with motor vehicles which are structured and arranged to allow the vehicle to continue moving along its path if the vehicle makes contact with an object that is not likely to cause damage or injury to the vehicle and occupants of the vehicle and not undesirably damage the object, and to stop the vehicle prior to the vehicle making contact with the object if such contact will cause damage or injury to the vehicle and occupants and/or cause unacceptable damage to the object.

An important aspect of the present invention is that it provides a new vehicle sliding bumper apparatus and system for use with motor vehicles which are structured and arranged to be utilized with a wide range of different types of vehicles, including driver/operator operated vehicles, remote-controlled vehicles and autonomous vehicles.

An important aspect of the present invention is that it provides a new vehicle sliding bumper apparatus and system which can be utilized with agricultural vehicles, such as tractors, harvesters and the like, that are beneficially configured to move along a path between rows of plants or plant locations in order to prepare the agricultural area for the plants, plant the plants in the agricultural area, maintain the agricultural area and/or plants, harvest crops and/or remove any waste materials from the agricultural area.

An important aspect of the present invention is that it provides a new vehicle sliding bumper apparatus and system for use with motor vehicles which are structured and arranged to be beneficially utilized in the agricultural industry to allow autonomous agricultural vehicles to operate in an agricultural area having paths between rows of plants in a manner that prevents damage to equipment, persons and plants in the agricultural area to facilitate the commercial cultivation of crops from the plants.

Yet another important aspect of the present invention is that it provides a new object collision detection and avoidance apparatus and system for use with motor vehicles which is easy to install on the vehicle and to be utilized therewith and which is relatively inexpensive to manufacture.

As will be explained in greater detail by reference to the attached figures and the description of the preferred embodiments which follows, the above and other objects and aspects are accomplished or provided by the present invention. As set forth herein and will be readily appreciated by those skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. As will be readily understood and appreciated, the scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth in the text below. The enclosed figures are illustrative of one or more potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the object collision detection and avoidance apparatus and system of the present invention and a motor vehicle with which the apparatus may be utilized, persons who are skilled in the art will readily appreciate that the present invention is not so limited. In addition, the exemplary embodiments of the present apparatus are shown and described with only those components which are required to disclose the present invention. It may be that some of the necessary elements for attaching and using the present invention are not shown or are not necessarily described below, but which are well known to persons skilled in the relevant art. As will be readily appreciated by such persons, the various elements of the present invention that are described below may take on any form consistent with those forms which are readily realized by persons of ordinary skill in the art having knowledge of support frames, switching mechanisms, electronics and motor vehicles, including driver/operator operated vehicles, remote-controlled vehicles and autonomous vehicles. For instance, the apparatus of the present invention can be removably or fixedly attached to the motor vehicle or be integrally formed therewith and the motor vehicle may have virtually any configuration.

Figure 1:
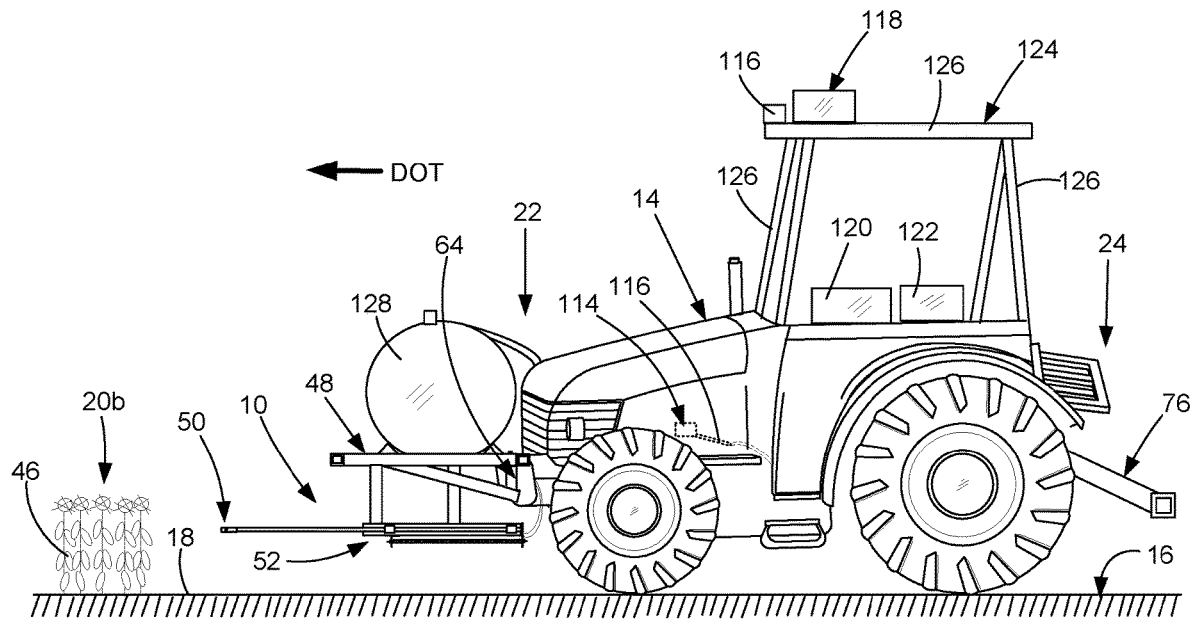
FIG. 1 is a left side view of a vehicle sliding bumper apparatus for use with a motor vehicle that is configured according to a preferred embodiment of the present invention shown mounted to the front end of a motor vehicle moving along a path to detect objects in the direction of travel of the motor vehicle, with the motor vehicle being a tractor.
Figure 2:
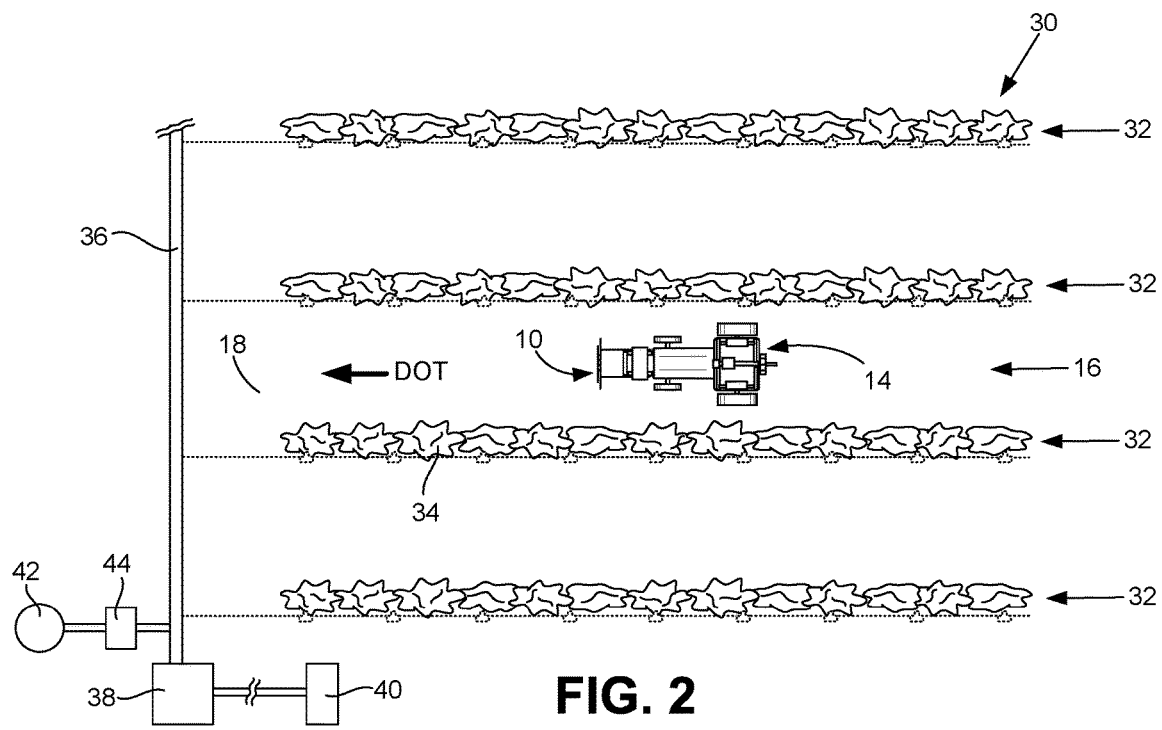
FIG. 2 is a top plan view of an agricultural area having plants that are disposed in rows with the motor vehicle and vehicle sliding bumper apparatus of FIG. 1 moving along a path between rows of plants.
Figure 8:
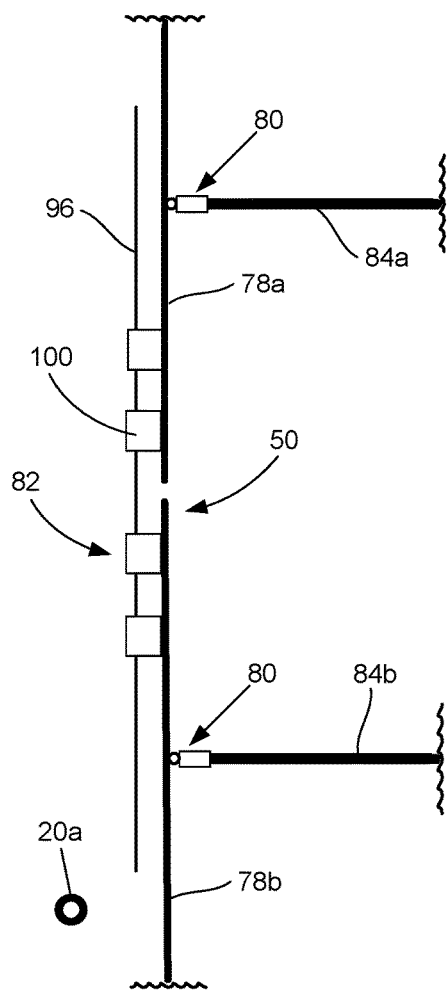
FIG. 8 is an isolated top view of the contact detection device of FIG. 7 shown prior to contacting an object located along the path in the direction of travel of a motor vehicle having the vehicle sliding bumper apparatus, with the object being a pipe.
Figure 9:
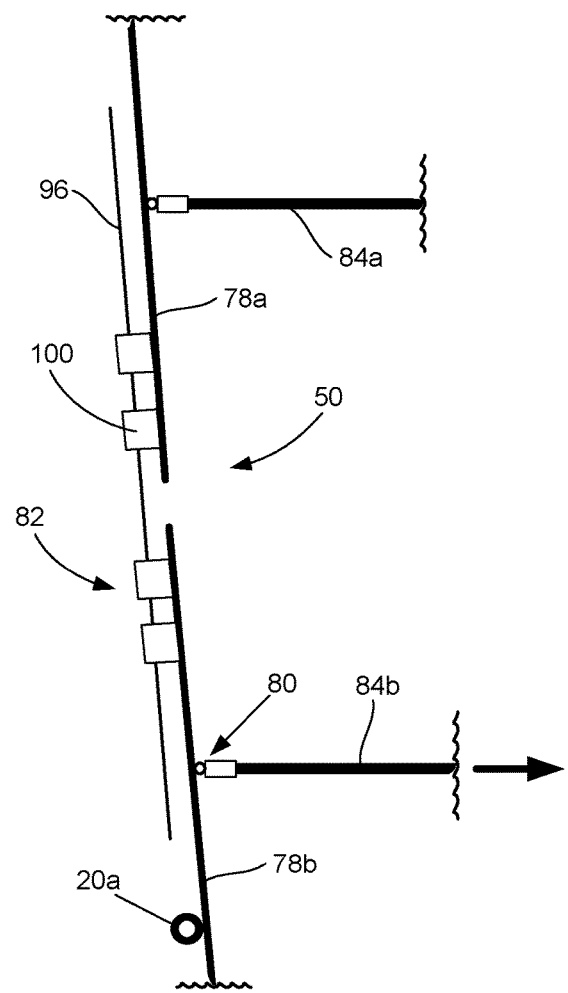
FIG. 9 is a top view of the contact detection device of FIG. 8 shown contacting the object of FIG. 8.

A vehicle sliding bumper apparatus that is configured pursuant to one of the preferred embodiments of the present invention is shown generally as 10 in FIGS. 1-6. An object collision detection and avoidance system utilizing the new apparatus 10 is shown as 12 in FIGS. 1-2 and 13. As described in more detail below and best shown in FIGS. 1 and 2, the new bumper apparatus 10 of the present invention is configured for use with a motor vehicle 14, shown in FIGS. 1 and 2, such that the bumper apparatus 10 will be disposed in the direction of travel (shown as DOT in FIGS. 1-2 and 8-9) as the motor vehicle 14 moves along a path 16 on a surface 18 thereof, as shown in FIGS. 1 and 2, to detect objects 20, as shown in FIGS. 1 and 8-9, that is in or near the path 16 such that the motor vehicle 14 may potentially collide with the object 20. The new bumper apparatus 10 of the present invention is structured and arranged to be attached to or integrally formed with the motor vehicle 14 so as to be disposed in the direction of travel DOT as the motor vehicle 14 moves along the path 16 on the surface 18 thereof. As set forth in more detail below, the bumper apparatus 10 is positioned on the motor vehicle 14 such that the bumper apparatus 10 will make contact with the object 20 before the motor vehicle 14 makes contact with the object 20 so, depending on the object 20, the motor vehicle 14 will either be allowed to proceed in the direction of travel DOT to collide with and/or run over the object 20 or the motor vehicle 14 will be stopped before colliding with the object 20.

Although the motor vehicle 14 shown in FIGS. 1 and 2 and described in more detail below is a tractor, persons who are skilled in the art will readily appreciate that motor vehicle 14 can be any type of configuration of vehicle, including cars, trucks, mechanical harvesters, trains and the like that can move on a surface 18 which is defined by the path 16 in which the motor vehicle 14 moves in a direction of travel DOT. In addition, as will also be readily appreciated by persons who are skilled in the art, motor vehicle 14 may be any operative type of vehicle, including driver/operator operated vehicles, remote-controlled operated vehicles, autonomously operated vehicles or other types of vehicles, including vehicles which are hybrids of one or more of the above-described vehicles. Although FIGS. 1 and 2 show the bumper apparatus 10 of the present invention attached to the front or forward end 22 of the motor vehicle 14, the bumper apparatus 10 may also, or in addition thereto, be attached to the back or rearward end 24 of the motor vehicle 14 and/or one or more of the sides, such as the left or first side 26 and/or the right or second side 28, which ends 22/24 and sides 26/28 are shown in FIGS. 1 and 2. As utilized herein, the terms "front", "forward", "forwardly" and the like are utilized herein to refer to or toward what is normally considered the front end of the motor vehicle 14 and the terms "back", "rearward", "rearwardly" and the like are utilized herein to refer to or toward what is normally considered the back end of the motor vehicle 14. For instance, in FIGS. 1 and 2, the bumper apparatus 10 extends forwardly of the front end 22 of the motor vehicle 14 for use to detect objects 20 in a forward direction of travel DOT.

In addition, although the figures and description herein are primarily directed to the new bumper apparatus 10 and system 12 being utilized with a motor vehicle 14 (such as the tractor) to move along a path 16 in an agricultural area 30, with the path 16 being defined between adjacent parallel or nearly parallel rows 32 of plants 34, as shown in FIG. 2, persons who are skilled in the art will readily appreciate that the present invention is not so limited. In addition to different types of motor vehicles 14, the bumper apparatus 10 and system 12 can be utilized with motor vehicles 14 that are used, primarily or even exclusively, to move along a path 16 having a surface 18 which defines a freeway, highway, road, street, driveway, track or the like, whether the surface 18 of the path 16 is paved, dirt, concrete, steel or comprising other materials or combinations thereof. More specifically, as will be readily appreciated by persons who are skilled in the relevant arts, the new bumper apparatus 10 and system 12 can be utilized with any type of motor vehicle 14 that moves along any type of path 16, no matter the shape and configuration of the motor vehicle 14 and/or the path 16.

As will also be readily appreciated by persons skilled in the art, the objects 20 which may be on or in the surface 18 along the path 16 in the direction of travel DOT of motor vehicle 14 may be a wide variety of different configurations and types of objects. For purposes of describing the present invention, the objects 20 which may be in the path 16 of the motor vehicle 14 are described as either being of a first object type 20*a*, shown in FIG. 1, and a second object type 20*b*, shown in FIGS. 8-9. The first object type 20*a* are defined as those with which the motor vehicle 14 should not make contact with as the motor vehicle 14 moves along the path because such contact could or is likely to damage the motor vehicle 14, harm any occupants of the motor vehicle 14 (including a driver or operator thereof) and/or damage the object 20. The first object type 20*a* may be people, pets or other animals, other vehicles, posts, poles, signs, mailboxes, trees, bushes and the like. In an agricultural area 30 the first object type 20*a* may be plants 34 or parts thereof, trellises and other support structures for the plants 34, posts, poles, pipes 36, manifolds 38, pumps 40, storage tanks 42, injectors 44 and the like (such as those shown in the exemplary agricultural area 30 of FIG. 2). As will be readily appreciated by persons who are skilled in the relevant art, it is important that collisions between motor vehicles 14 and the first object type 20*a* be prevented. The second object type 20*b* are those which, if contacted by the motor vehicle 14, will not result in harm to the motor vehicle 14 and/or occupants of the motor vehicle 14 and, depending on what the second object type 20*b* is, will not result in any significant harm or damage to the second object type 20*b* or any such harm or damage that occurs is acceptable. For instance, the second object type 20*b* may be grass, weeds (shown as 46 in FIG. 1) or other non-beneficial plants or items (i.e., cut branches, trimmed plant material and the like) that can be pushed over, moved aside or even run over by the motor vehicle 14 without damage or if damaged by motor vehicle 14, the damage to the object 20*b* is acceptable. As will be readily appreciated by persons who are skilled in the art, the objects 20 described above as the first object type 20*a* and the second object type 20*b* are presented as being merely exemplary of the types of objects 20 that fall within these general categories and which may be encountered by a motor vehicle 14 as it moves along a path 16 and is, therefore, not intended to be limiting as to the scope of the bumper apparatus 10 and system 12 of the present invention.

As best shown in FIGS. 3-6, the bumper apparatus 10 of the present invention generally comprises a support frame 48, a contact detection device 50 and a contact indicator device 52, as best show in FIGS. 3-6. For purposes of describing the relative positional relationships of the various components of the bumper apparatus 10, the bumper apparatus 10 has a first/proximal end 54 that is at or toward one end 22/24 or side 26/28 of the motor vehicle 14, a second/distal end 56 which extends outwardly away from the subject end 22/24 or side 26/28 of the motor vehicle 14, a first/left side 58 and a second/right side 60. As shown in the embodiment set forth in the figures, the first side 58 and second side 60 of the bumper apparatus 10 generally correspond, respectively, to the first side 26 and second side 28 of the motor vehicle 14, as shown in FIG. 2. As set forth in more detail below, the support frame 48 supports the bumper apparatus 10 on the motor vehicle 14, the contact indicator device 52 is moveably supported by the support frame 48 and the contact detection device 50 is supported by the contact indicator device 52 so as to make contact with an object 20 that is along the path 16 in the direction of travel DOT and, if the object 20 is of the first object type 20*a*, move the contact indicator device 52 relative to the support frame 48 to stop the motor vehicle 14 before the motor vehicle 14 hits the object 20.

Figure 4:
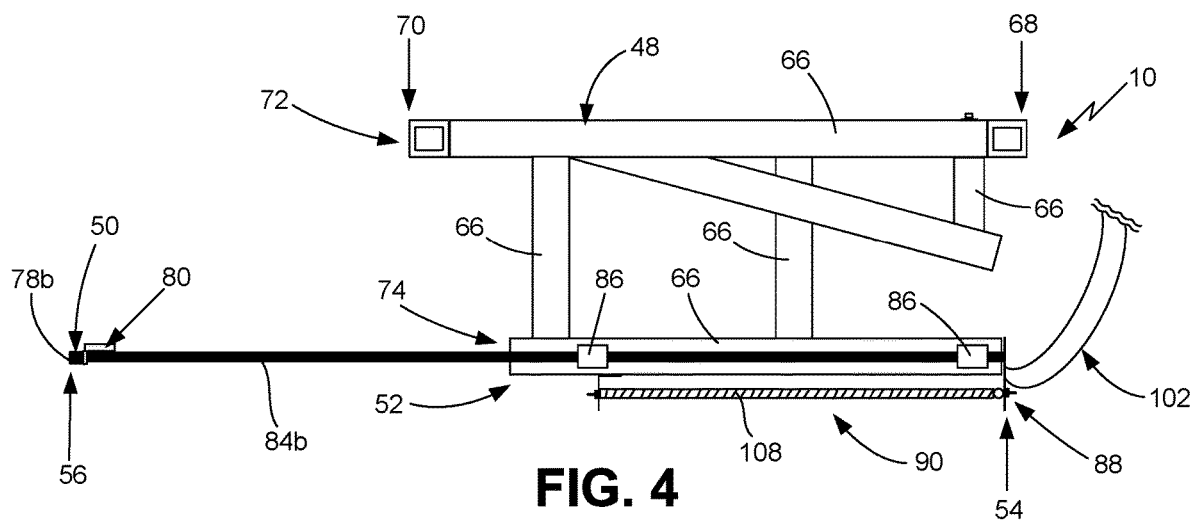
FIG. 4 is a left side view of the vehicle sliding bumper apparatus of FIG. 3.
Figure 5:
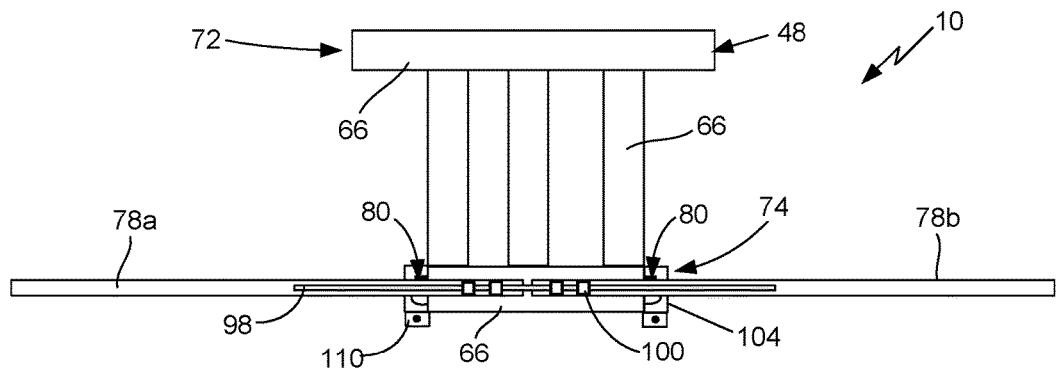
FIG. 5 is a front view of the vehicle sliding bumper apparatus of FIG. 3.
Figure 6:
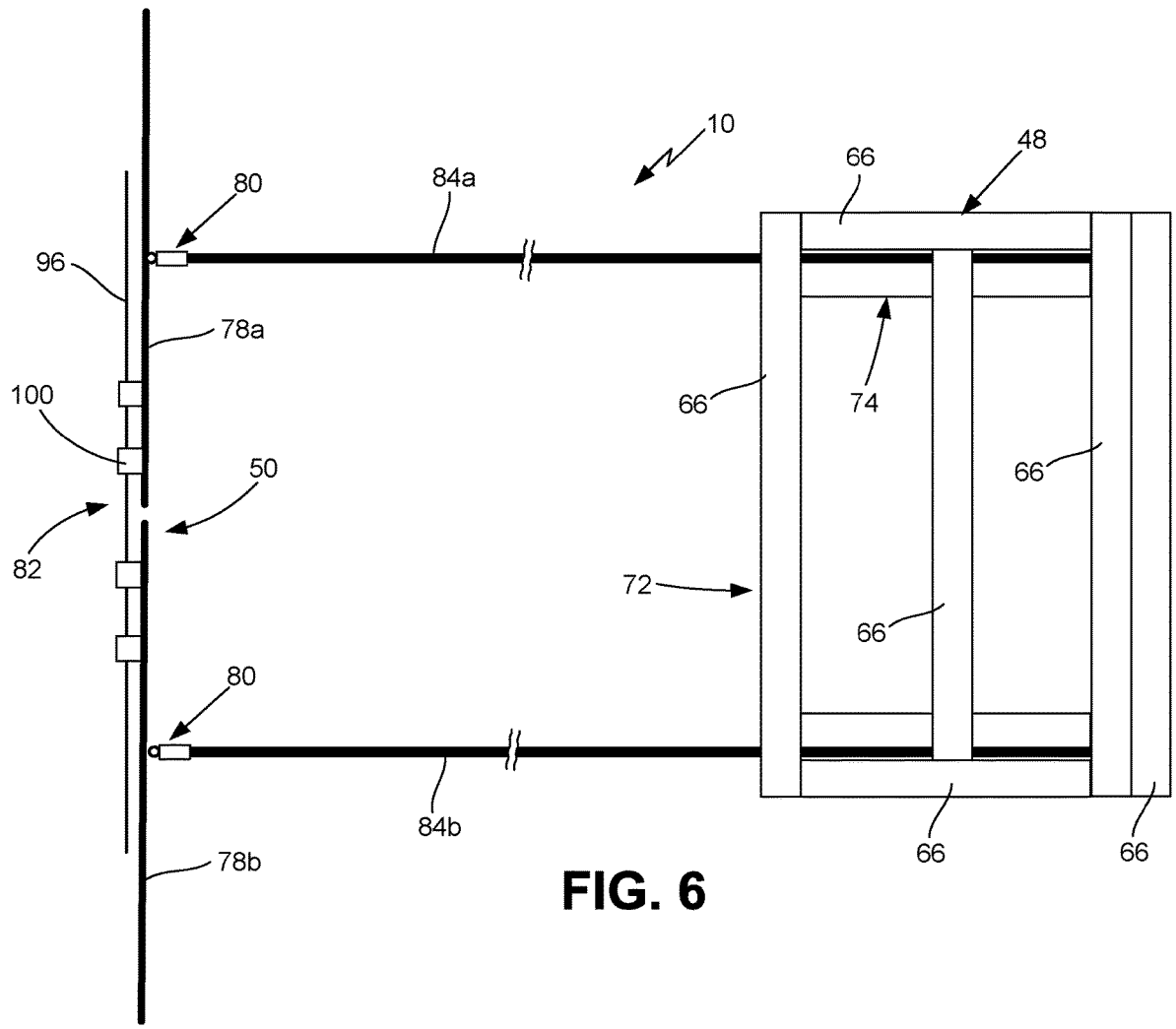
FIG. 6 is a top view of the vehicle sliding bumper apparatus of FIG. 3.

The support frame 48 is structured and arranged to be attached to or integrally formed with one or more components of the motor vehicle 14 so the bumper apparatus 10 will be supportedly carried by motor vehicle 14 and extend outwardly from the motor vehicle 14, as shown in FIGS. 1 and 2, as the motor vehicle 14 moves along the path 16. Generally, the bumper apparatus 10 will be located at or near the front end 22 or back end 24 thereof (at front end 22 in FIGS. 1 and 2) so as to extend, respectively, forwardly or rearwardly from the respective end 22/24 of motor vehicle 14 in the direction of travel DOT of the motor vehicle 14. In one configuration, the bumper apparatus 10 has a clamping assembly 62 that is attached to or integral with the support frame 48 at the first/proximal end 54 of the bumper apparatus 10, as shown in FIG. 4, which is structured and arranged to securely engage the motor vehicle 14 by clamping onto a component of the motor vehicle 14. In the embodiments shown in the figures, the clamping assembly 62 of the bumper apparatus 10 is structured and arranged to securely engage the front bumper 64 of motor vehicle 14, as best shown in FIG. 1, such that the bumper apparatus 10 extends forwardly from the front bumper 64 of motor vehicle 14 for a forward direction of travel DOT.

In the embodiment shown in FIG. 1, the bumper apparatus 10 extends outward from the front end in a cantilever manner. In other embodiments, one or more wheeled support members, or other devices, can be utilized to help support the bumper apparatus 10 on the motor vehicle 14 above the surface 18 of the path 16 along which the motor vehicle 14 is traveling (i.e., the direction of travel DOT). The support frame 48 of bumper apparatus 10 comprises a plurality of frame members 66, as best shown in FIGS. 3-6, that are sized and configured to extend the bumper apparatus 10 outward, whether forward, rearward or sideways, from the motor vehicle 14 in the direction of travel DOT of the motor vehicle 14. As shown in these figures, the frame members 66 may be extend longitudinally along all or part of the length of support frame 48, vertically across all or part of the height of support frame 48, transversely across all or part of the width of support frame 48 and/or diagonally across all or a part of the support frame 48. The various frame members 66 are sized and configured as may be beneficial and/or necessary to sufficiently support the bumper apparatus 10 on the motor vehicle 10.

Figure 3:
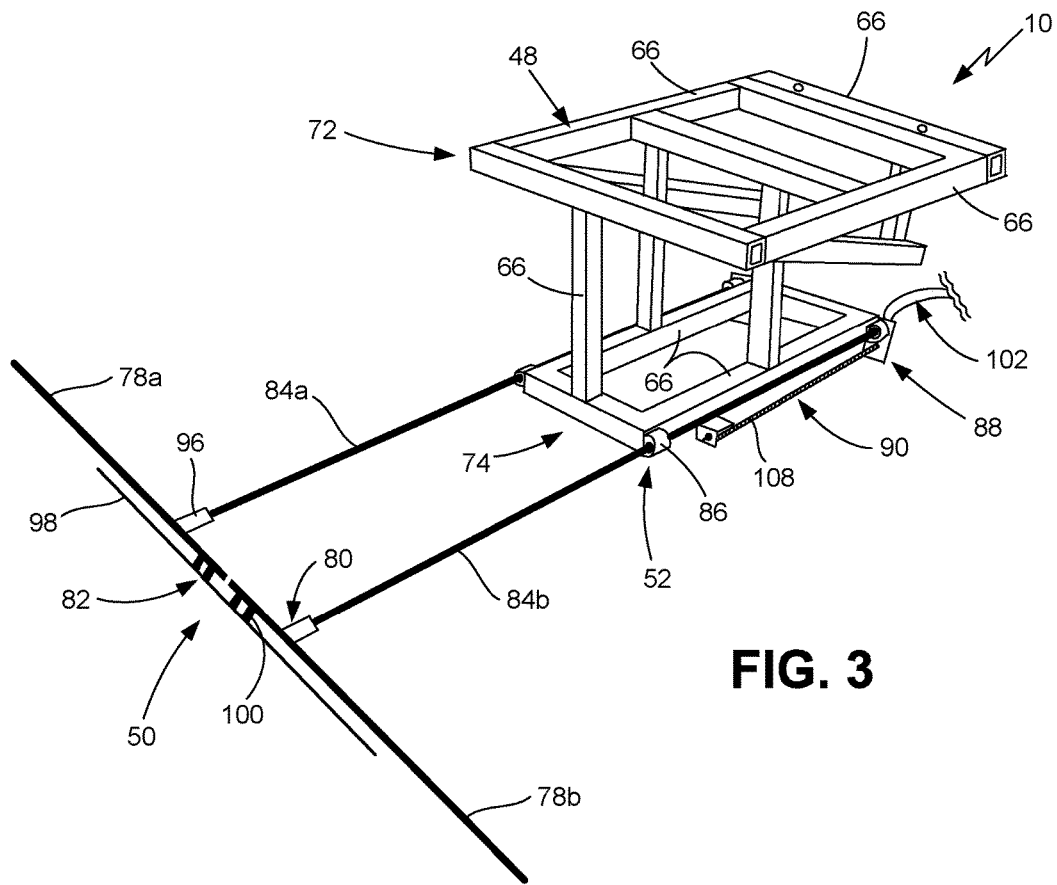
FIG. 3 is a left side perspective view of the vehicle sliding bumper apparatus of FIG. 1 shown separate from the motor vehicle.

The frame members 66 of support frame 48 define a first or proximal end 68, a second or distal end 70, an upper section 72 and a lower section 74, as best shown in FIG. 3. As with the new bumper apparatus 10 itself, the terms "proximal" and "distal" refer to the location of the component relative to the end 22/24 or side 26/28 of the motor vehicle 10 where the bumper apparatus 10 is attached to or integral with so as to avoid collisions with first object types 20a that could cause damage or harm. More specifically, the first/proximal end 68 of the support frame 48, which typically corresponds to the first/proximal end 54 of the bumper apparatus 10 itself, is positioned at or near the front/forward end 22 of the motor vehicle 14 and the second/distal end 70 of the support frame 48 extends outward (in a forward direction in FIGS. 1 and 2) from the first/proximal end 54 of the support frame 48. As set forth in more detail below, in the embodiment shown in FIGS. 1 and 2, the upper section 72 of the support frame 48 is utilized to support other components that are useful for the autonomous operation of the motor vehicle 14. The lower section 74 of the support frame 48 is utilized to moveably support the contact indicator device 52. In one embodiment, the frame members 66 that make up the support frame 48 are made out of metal which is selected, coated and/or covered to be sufficiently corrosion resistant for the purposes and conditions for which the bumper apparatus 10 will be utilized, most of which will typically be outdoors. As will be readily appreciated by persons skilled in the relevant art, various non-metal materials can also be utilized for the support frame 48, including certain composites, hard plastics and the like.

In the embodiment shown in the figures, the clamping assembly 62 is integrally formed with or attached to the first/proximal end 68 of the support frame 48, which is at or near the first/proximal end 54 of the bumper apparatus 10, and the clamping assembly 62 is structured and arranged to engage and securely clamp onto the front bumper 64 of the motor vehicle 10, as shown in FIG. 1. In other embodiments, the clamping assembly 62 can be configured to clamp onto the rear bumper of the motor vehicle 14 or onto a towing assembly 76, shown in FIG. 1, at the back/rearward end 24 of the motor vehicle 14 in order to provide the various benefits of the bumper assembly 10 when the motor vehicle 14 is moving in a rearwardly direction. In other embodiments, the clamping assembly 62 can be structured and arranged to clamp onto one or more frame members 66 and/or other components of the motor vehicle 14. Alternatively, the support frame 48 of the bumper apparatus 10 can be integral with the frame or other components of the motor vehicle or the support frame 48 can be removably (i.e., with bolts, screws and other connectors) or fixedly (i.e., by welding, rivets or other mechanisms) attached to the frame and/or other components of the motor vehicle 14. In any of these arrangements, it may not be necessary for the bumper apparatus 10 to have the clamping assembly 62 at all. In any configuration of joining the bumper apparatus 10 to the motor vehicle 14, the bumper apparatus 10 must be sufficiently secured to the motor vehicle 14 such that the bumper apparatus 10 will stay connected to the motor vehicle 14 and maintain the ability of the bumper apparatus 10 to function in its desired manner with regard to objects 20 as the motor vehicle 14 moves, at speed, along the path 16 in the desired direction of travel DOT, on a smooth or rough surface 18 and while contacting any objects 10 on the path 16, particularly those of the first object type 20a.

As best shown in FIGS. 1 and 3-6, the support frame 48 moveably supports the contact indicator device 52 in a manner that positions the contact detection device 50 at the second/distal end 56 of the bumper apparatus 10 so the contact detection device 50 will contact an object 20 before the motor vehicle 14 contacts the object 20. As set forth above, if the object 20 is of the first object type 20a that can cause damage or harm, the contact detection device 50 moves the contact indicator device 52, thereby indicating undesirable non-allowed contact, to stop the motor vehicle 14 before the motor vehicle 14 hits the first object type 20a. As also set forth above, if the object 20 is of the second object type 20b that can be safely hit or run over, the contact detection device 50 will not move the contact indicator device 52, thereby indicating an allowed contact, and the motor vehicle 14 will be allowed to continue to move in the direction of travel DOT along the path 16. The ability of the bumper apparatus 10 to positively and absolutely distinguish between undesirable/non-allowed contact and allowed contact with an object 20, as set forth above and in more detail below, differentiates the bumper apparatus 10 of the present invention from prior art apparatuses and systems for preventing contact with an object 20 by analyzing the characteristics of the object 20 or for absorbing a collision with the motor vehicle 14.

In a preferred configuration of the new bumper apparatus 10, contact detection device 50 comprises a pair of transversely disposed, elongated axially aligned contact or detector rods 78, which are shown as first detector rod 78a and second detector rod 78b, a pivot mechanism 80 associated with each one of the detector rods 78a/78b and a bump stop assembly 82 at the second/distal end 56 of the bumper apparatus 10 that forces the two detector rods 78a/78b to function together in a cooperative manner, as best shown in FIGS. 3-9 to send or not send a stop command to motor vehicle 14. In a preferred configuration of the bumper apparatus 10, the contact indicator device 52 comprises a pair of spaced apart, longitudinally disposed, elongated indicator rods 84, shown as first indicator rod 84a and second indicator rod 84b in FIGS. 3 and 6-9, one or more rod supports 86 that moveably support the indicator rods 84, a switching mechanism 88 that sends a signal to the motor vehicle 14 to direct the motor vehicle 14 to stop and a biasing mechanism 90 that is operatively connected to the switching mechanism 88 to keep the switching mechanism 88 in its closed position (shown in FIG. 12), which allows the motor vehicle 14 to continue moving in the direction of travel DOT along the path 16, as best shown in FIGS. 3-6 and 8-12. As set forth in more detail below, the above components are cooperatively sized and configured to stop the movement of the motor vehicle 14 if the bumper apparatus 10 contacts an object 20 of the first object type 20a (those that can cause damage or harm) and allows the motor vehicle 14 to continue moving in its direction of travel DOT if the bumper apparatus 10 does not contact any objects 20 or contacts an object 20 that is of the second object type 20b (those which are ok to hit or run over). More specifically, if one or both of the detector rods 78a/78b contacts a first object type 20a, the pivot mechanism 80 and bump stop 82 will work together to cause the subject detector rod 78a/78b to push the associated indicator rod 84a/84b inward, as shown with regard to FIGS. 8 and 9, toward the motor vehicle 14 along the rod supports 86, which will push the switching mechanism 88 to its open position 92, shown in FIG. 12, and send a signal to the motor vehicle 14 to cause the motor vehicle 14 to stop before the motor vehicle 14 collides with the first object type 20a. If the detector rods 78a/78b make contact with an object 20 of the second object type 20b, then the detector rods 78a/78b will push the second object type 20b over or move it out of the way, such that the biasing mechanism 90 keeps the switching mechanism 88 in its closed position, shown in FIG. 11. If there is no first object type 20a or after the first object type 20a has been cleared out of the path 16 of the motor vehicle 14, the detector rods 78a/78b will be axially aligned and the biasing mechanism 90 will bias the switching mechanism 88 back to its closed position 94, as shown in FIGS. 8 and 11, thereby allowing motor vehicle 14 to move forward along the path 16 in its direction of travel DOT, as shown in FIGS. 1 and 2.

The detector rods 78 are sized and configured to have sufficient length to extend at least to, preferably beyond, the sides 26/28 of the motor vehicle 14 so that the detector rods 78 will make contact with any object 20 in the path 16 which may be hit or run over by the motor vehicle 14 if the motor vehicle 14 was not utilizing bumper apparatus 10 of the present invention. Each of the detector rods 78 must be sufficiently rigid to support its own weight so the detector rods 78 will maintain a desired generally horizontal alignment above the surface 18 of the path 16 and be sufficiently rigid so as to push the indicator rods 84 of contact indicator device 52 inward when the contact detection device 50 of the bumper apparatus 10 makes contact with an object 20 of the first object type 20a and to push over or out of the way any object 20 that is of the second object type 20b without moving the indicator rods 84 inward. In one embodiment, the detector rods 78 are made out of a metal that is selected, coated and/or covered to be sufficiently corrosion resistant for the purposes and conditions for which the bumper apparatus 10 will be utilized, most of which will typically be outdoors. As will be readily appreciated by persons who are skilled in the relevant art, various non-metal materials can also be utilized for the detector rods 78, including certain composites, hard plastics and the like.

In a preferred configuration of the contact detection device 50, each of the detector rods 78 are pivotally connected to the respective indicator rods 84 of the contact indicator device 52 with a pivoting mechanism 80 that is associated with each combination of detector rods 78 and indicator rods 84 (namely, first detector rod 78a/first indicator rod 84a and second detector rod 78b/second indicator rod 84b) to allow the detector rod 78a/78b that makes contact with a first object type 20a in the path 16 of the direction of travel DOT to pivot inward toward the motor vehicle 14 which will push the respective indicator rod 84a/84b of the contact indicator device 52 inward toward motor vehicle 14 and initiate a process that stops the motor vehicle 14. As best shown in FIGS. 3-4, 6 and 8-9, the pivot mechanism 80 pivotally interconnects each detector rod 78a/78b and respective indicator rod 84a/84b of the contact indicator device 52 in a manner which allows both of the detector rods 78a/78b to pivot in either direction. Preferably, the pivot mechanism 80 is structured and arranged to allow a detector rod 78a/78b to freely pivot relative to its respective indicator rod 84a/84b of the contact indicator device 52. In one configuration, the pivot mechanism 80 is a freely, or at least having a low resistance, pivoting hinge 96. In this manner, when a detector rod 78a/78b makes contact with an object 20 of the first object type 20a, those which can cause damage or harm, the detector rod 78a/78b will be allowed to pivot toward the motor vehicle 14. As set forth below, the bump stop 82 will cause the pivoting movement of the detector rod 78a/78b to push the respective indicator rod 84a/84b toward the motor vehicle 14 to place the switching mechanism 88 in its open position 92 and send a command to the motor vehicle 14 to stop. The configuration and use of pivot mechanisms 80, such as hinge 96 are generally well known to persons who are skilled in the relevant arts.

Figure 7:
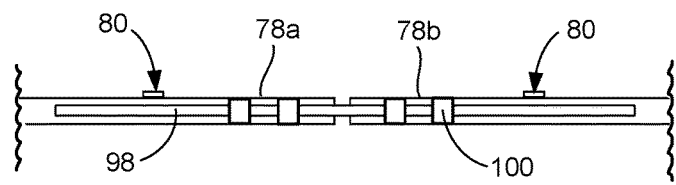
FIG. 7 is an isolated front view of the contact detection device of the vehicle sliding bumper apparatus of FIG. 5 to better illustrate the bump stop thereof.

As will also be readily appreciated by persons who are skilled in the art, the detector rods 78 cannot be allowed to pivot so freely that the detector rod 78a/78b that hits a first object type 20a will merely pivot relative to the respective indicator rod 84a/84b of the contact indicator device 52, which would result in the contact detection device 50 not engaging the contact indicator device 52 (i.e., not pushing the respective indicator rod 84a/84b toward the motor vehicle 14) in a manner that opens the switching mechanism 88 and stops the motor vehicle 14, which would result in the motor vehicle 14 hitting the first object type 20a. The bump stop 82 is structured and arranged to force the detector rod 78a/78b that contacts the second object type 20b to engagedly push the respective indicator rod 84a/84b toward the motor vehicle 14 and open the switching mechanism 88 and stop the motor vehicle 14. The bump stop 82 comprises an elongated connecting rod 98 and a plurality of rod mounts 100, as best shown in FIGS. 7-9. At least one rod mount 100 is attached to each of the detector rods 78a/78b. Each rod mount 100 has an aperture therethrough that is sized and configured to receive the connecting rod 98 and to allow the respective detector rods 78a/78b to slide relative to the rod mounts 100, which will allow each of the detector rods 78a/78b to controllably pivot (i.e., not freely pivot) relative to the respective indicator rod 84a/84b. The controlled pivoting provided by the bump stop 82, shown with regard to FIGS. 8 and 9, will cause a detector rod 78a/78b that makes contact with an object 20 of the first object type 20a to push the respective indicator rod 84a/84b inward toward the motor vehicle 14 to place the switching mechanism 88 in its open position 92, which will send a signal to the motor vehicle 14 to stop.

Figure 12:
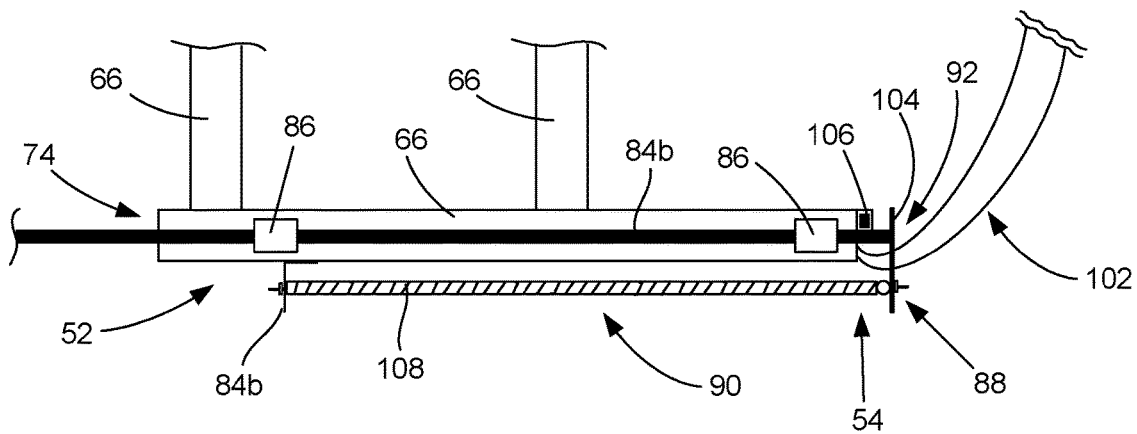
FIG. 12 is an isolated left side view of the vehicle sliding bumper apparatus of FIG. 11 showing the switching mechanism in its open position 11.

In an alternative configuration, the detector rod 78 can be a single elongated rod or rod-like component that is fixedly attached to the contact indicator device 52, which will make the bump stop 82 of the contact detection device 50 unnecessary. In this configuration, when the single detector rod 78 of the detection device 50 contacts a first object type 20a, the detector rod 78 will pivot in response to such contact to push the subject indicator rod 84a/84b inward toward the motor vehicle 14 and place the switching mechanism 88 in its open position 92, as shown in FIG. 12. Although this configuration can function, the inventor has found that, depending on the materials, sizes and configuration of the detector rod 78 and/or the indicator rods 84, it can result in one or more of such rods more easily breaking as a result of contact with a first object type 20a. As a result, it is anticipated that use of the bump stop 82 and pair of detector rods 78a/78b will be preferred. In yet another alternative embodiment, the contact detection device 50 can comprise a single indicator rod 78 without the use of the pivot mechanisms 80, such that the indicator rod 78 is directly connected to, whether attached to or integral with, the distal ends of the two indicator rods 84a/84b. In this configuration, when the contact detection device 50 contacts a first object type 20a, the entire contact detection device 50 will be moved inward (toward the motor vehicle 14) to push the indicator rods 84*a*/84*b* inward to place the switching mechanism 80 in its open position 92 to send a signal that stops the movement of the motor vehicle 14 in the its direction of travel DOT before the motor vehicle 14 collides with the first object type 20*a*. While this may not present any problems for a first object type 20*a* that is at or near the center of the detector rod 78, if the first object type 20*a* is at, near or even towards the distal ends of the detector rod 78, this configuration may be more likely to break the connection between the detector rod 78 and the indicator rods 84*a*/84*b* upon such contact.

Each of the indicator rods 84 are sized and configured to have sufficient length to extend from the contact detection device 50 at the second/distal end 56 of bumper apparatus 10 to the switching mechanism 88 located at the first/proximal end 54 of bumper apparatus 10, as best shown in FIGS. 1, 3-4 and 6, so the indicator rods 84 can move the switching mechanism 88 to its open position 92, as shown in FIG. 12, when the detector rods 78 of the contact detection device 50 contacts a first object type 20*a*. The indicator rods 84 are longitudinally aligned along the sides 58/60 of the bumper apparatus 10 and slidably held in position by the rod supports 86, which may be mounted to the lower section 74 of the support frame 48, as shown in FIGS. 1, 3 and 10-12. Preferably, the length of the indicator rods 84 is selected to allow sufficient time for the motor vehicle 14 to come to a complete stop before hitting a first object type 20*a* after one or more of the detector rods 78 of the contact detection device 50 contacts the first object type 20*a* and the switching mechanism 88 is moved to its open position 92, shown in FIG. 12. As will be readily appreciated by persons skilled in the relevant art, the faster the anticipated speed of the motor vehicle 14 along the path 16, the longer will be the required length of the indicator rods 84. Each of the indicator rods 84 must be sufficiently rigid to support its own weight (distally of the rod supports 86) so the indicator rods 84 will maintain a desired generally horizontal alignment above the surface 18 of the path 16. In addition, each indicator rod 84 must be sufficiently rigid so as to be pushed inward by a detector rod 78*a*/78*b* of the contact detection device 50 and open the switching mechanism 88 when contact detection device 50 makes contact with an object 20 of the first object type 20*a* and allow the bumper apparatus 10 to push over or out of the way any object 20 that is of the second object type 20*b* without moving the indicator rods 84 inward. In one embodiment, the indicator rods 84 are made out of a metal which is selected, coated and/or covered to be sufficiently corrosion resistant for the purposes and conditions for which the bumper apparatus 10 will be utilized, most of which will typically be outdoors. As will be readily appreciated by persons who are skilled in the relevant art, various non-metal materials can also be utilized for the indicator rods 84, including certain composites, hard plastics and the like.

As set forth above, the contact indicator device 52 of the bumper apparatus 10 of the present invention has one or more rod supports 86 associated with each of the indicator rods 84*a*/84*b*, as best shown in FIGS. 1 and 3-6. Each of the rod supports 86 are attached to or integral with one or more frame members 66 of the support frame 48. In the configuration shown in the figures, the rod supports 86 are attached to or integral with a frame member 66 of the lower section 74 of the support frame 48, as best shown in FIGS. 3-4 and 10-12. Each rod support 86 has an aperture therethrough that slidably receives and supports an indicator rod 84*a*/84*b* as the indicator rod 84*a*/84*b* slides inward toward the motor vehicle 14 in response to the contact detection device 50 contacting a first object type 20*a* (the type which can cause damage and/or injury) and slides outward away from the motor vehicle in response to being biased by the biasing mechanism 90, as shown with regard to FIGS. 11 and 12. As will be readily appreciated by persons skilled in the art, a wide variety of different types and configurations of devices can be used for the rod supports 86. For instance, the rod supports 86 can be one or more tubular members, one or more (typically a plurality of) ring or ring-like members and the like on each side 58/60 of the bumper apparatus 10 that are sized and configured to slidably support the indicator rods 84*a*/84*b*.

The switching mechanism 88 is structured and arranged to open and close (or move between an off and on condition) in response to the movement of the indicator rods 84*a*/84*b*, which move in response to contact between the detector rods 78 of the contact detection device 50 contacting an object 20 that is of the first object type 20*a* that can cause damage or injury if the motor vehicle 14 were to collide with the first object type 20*a*. A wide variety of different types of switching mechanisms can be utilized as the switching mechanism 88 of bumper apparatus 10 of the present invention as long as such switching mechanisms are responsive to the inward (toward motor vehicle 14) movement of the indicator rods 84 in response to contact between the detector rods 78 and a first object type 20*a*.

Figure 10:
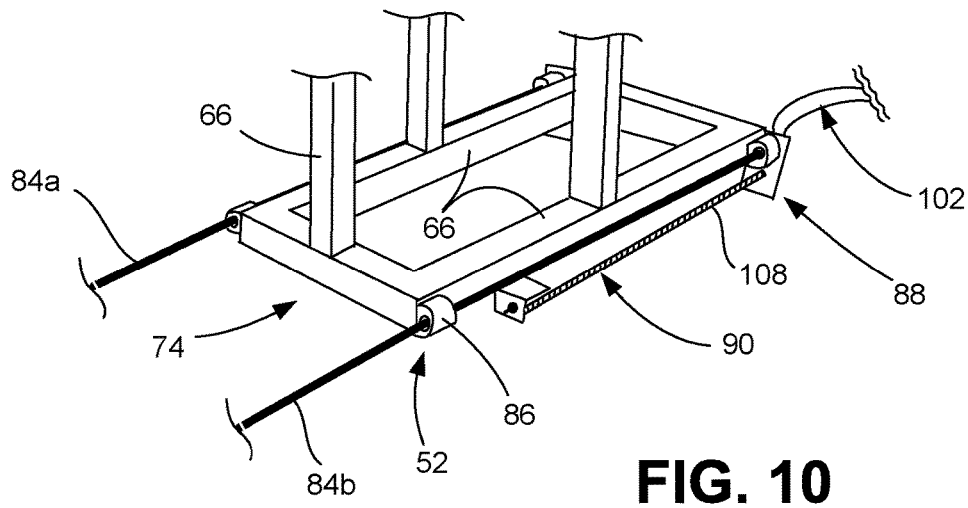
FIG. 10 is an isolated left side perspective view of the lower section of the support frame of the vehicle sliding bumper apparatus of FIG. 3 specifically illustrating the elongated indicator rod, rod supports, biasing mechanism and switching mechanism thereof.
Figure 11:
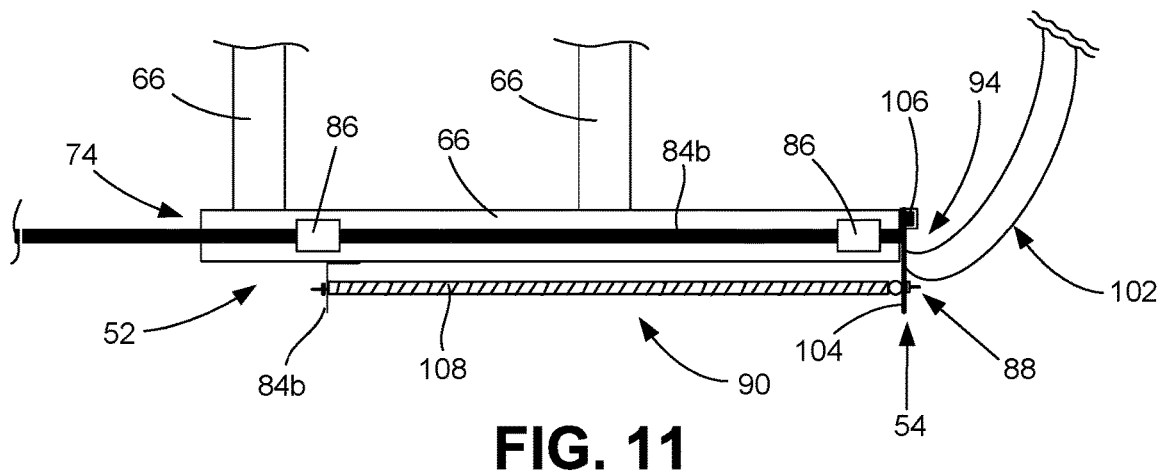
FIG. 11 is a left side view of the vehicle sliding bumper apparatus of FIG. 10 showing the switching mechanism in its closed position.

In the embodiment shown in the figures, the switching mechanism 88 utilizes a reed switch 101 that connects to electrical wires 102 which connect to an assembly that operates the brakes of the motor vehicle 14, as set forth in more detail below, and a magnet 103 that is mounted on a support plate 104 that moves in and out of magnetic engagement with the reed switch 101, as shown in FIGS. 10-12 and summarized on the chart of FIG. 13. One support plate 104 is integral with or attached to the proximal end of each of the indicator rods 84*a*/84*b*, as best shown in FIGS. 6 and 10-12, such that movement of the indicator rods 84*a*/84*b* inward and outward will move the support plate 104 inward and outward at the first/proximal end 54 of the bumper apparatus 10, as shown with regard to FIGS. 11-12. In the embodiment shown in the figures, the reed switch 101 is associated with, by being integral with or attached to, a block support 106 at the first/proximal end 54 of bumper apparatus 10, with the block support 106 being positioned sufficiently close to the support plate 104 such that when the switching mechanism 88 is in its closed position 92 with the support plate 104 at the first/proximal end 54 of the bumper apparatus 10, as shown in FIG. 11, the magnet 103 on the support plate 104 will be in magnetic engagement with the reed switch 101 on the block support 106. The reed switch 101 of switching mechanism 88 is configured such that when the support plate 104 is at the first/proximal end 54 (i.e., switching mechanism 88 in its closed position 94, as shown in FIG. 11), which occurs when there are no objects 20 in the path 16 or if there are objects 20 in the path 16 they are of the second object type 20*b* (no damage or harm likely), the magnet 103 will magnetically engage the reed switch 101 to allow the motor vehicle 14 to continue moving along the path 16 and when the support plate 104 having the magnet 103 thereon is moved inward toward motor vehicle 14 and away from the first/proximal end 54 (i.e., switching mechanism 88 in its open position 92, as shown in FIG. 12 and the magnet 103 is moved out of engagement with the reed switch 101), which occurs when there is an object 20 of the first object type 20*a* in the path 16 and one or more of the detector rods 78 of the contact detection device 50 has made contact with the first object type 20*a*, the signal sent to the motor vehicle 14 will stop motor vehicle 14. As will be readily appreciated by persons who are skilled in the art, a number of variations can be made to the switching mechanism 88 that is described above. For instance, the reed switch 101 could be attached directly to the support frame 48 (i.e., no block support 106) or the location of the reed switch 101 and the magnet 103 can be switched (i.e., the magnet 103 can be associated with the block support 106 or support frame 48 and the reed switch 101 can be mounted on the moving support plate 102). As will be readily appreciated by persons skilled in the relevant art, other variations may also be possible.

As set forth above, the switching mechanism 88 is connected to a biasing mechanism 90 that is structured and configured to maintain the switching mechanism 88 in the closed position 94, as best shown in FIG. 11, and to bias the switching mechanism 88 back to the closed position 94 when it has been moved to the open position 92 (i.e., after contact with an object 20 of the first object type 20a has been cleared by removing or driving around the first object type 20a). As will be readily appreciated by persons who are skilled in the art, it is necessary to maintain the switching mechanism 88 in the closed position 94 to allow the motor vehicle 14 to move along the path 16 in the desired direction of travel DOT. The biasing mechanism 90 prevents inadvertent or accidental disengagement of the switching mechanism 88 due to bumps or other uneven surfaces 18 along the path 16 that, without the biasing mechanism 90, could result in the motor vehicle 14 being directed to stop although there are no objects 20 in the path 16 that are first object types 20a. In addition, the biasing mechanism 90 is utilized to adjust for the amount of force that determines which objects 20 are of the first object type 20a and the second object type 20b. The amount of force needed to overcome the biasing force of the biasing mechanism 90 will determine how "strong" or potentially damaging an object 20 in the path 16 is, which will be an indication of the likelihood of a collision with the object 20 causing undesirable damage either to the motor vehicle 14 or object 20 or injury to occupants of the motor vehicle 14. More specifically, the greater the amount of force necessary to overcome the biasing force of the biasing mechanism 90 will correspond to the likelihood of causing damage or harm, such that if the biasing mechanism 90 has a high biasing force, fewer weak objects 20 will be considered to be second object types 20b and the lower the biasing force of the biasing mechanism 90 will result in more objects 20 being considered to be of the first object type 20a that will cause the motor vehicle 14 to stop. The inventor anticipates that different uses of the bumper apparatus 10 and system 12 will have different potential objects 20 being in the path 16 and, as a result, the biasing mechanism 90 will have to be selected or adjusted depending on what those objects 20 are, the likelihood those objects 20 will be of the first object type 20a and the desire to not have the motor vehicle 14 being stopped by objects 20 that are not of the first object type 20a.

In the embodiment shown in figures, the biasing mechanism 90 is a spring 108 having its first or proximal end attached to the support plate 104 and its second or distal end attached to a bracket 110 that is attached to or integral with one of the frame members 66 of the support frame 48 of the bumper apparatus 10, as best shown in FIGS. 3-4 and 10-12. For instance, the first/proximal end of the spring 108 can be bolted to the support plate 104 using an eye bolt or the like that allows the first/proximal end of the spring 108 to connect to the "eye" portion of the eye bolt. The second/distal end of the spring 108 can also be connected to an eye bolt that is bolted to the bracket 110 with the second/distal end of the spring 108 being connected to the "eye" portion of this eye bolt.

In one exemplary use, the new bumper apparatus 10 of the present invention is attached the front/forward end 22 of a motor vehicle 14 utilizing the clamping assembly 62 to securely clamp the support frame 48 of the bumper apparatus 10 to the front bumper 64 of the motor vehicle 14 such that the bumper apparatus 10 will extend forwardly of the motor vehicle 14 to check the path 16 in the forward direction of travel DOT for objects 20, as shown in FIGS. 1 and 2. As set forth above and/or readily apparent to persons skilled in the art, the bumper apparatus 10 can be securely attached to the front bumper 64 of the motor vehicle 14 by mechanisms other than clamping, the bumper apparatus 10 could be attached to the back/rearward end 24 or one of the sides 26/28 of the motor vehicle 14 for movement in the respective directions, the bumper apparatus 10 can be attached, by clamping or otherwise, to other components of the motor vehicle 14 and/or the bumper apparatus 10 can be made integral with the front bumper 64, frame or other components of the motor vehicle 14. Once the bumper apparatus 10 is on the motor vehicle 14, as shown in FIGS. 1 and 2, the motor vehicle proceeds in a direction of travel DOT on the surface 18 of a path 16, such as a path 16 between rows 32 of plants 34 in an agricultural area 30, as shown in FIG. 2. The bumper apparatus 10 will allow a driver/operator operated motor vehicle 14, a remote-controlled motor vehicle 14 or an autonomous motor vehicle 14 to proceed along the path 16 without concern that the motor vehicle 14 will collide with an object 20 that will damage the motor vehicle 14, damage an important and/or expensive object 20 and/or injure a person (as object 20) and/or any occupants of the motor vehicle 14.

If the bumper apparatus 10 encounters objects 20 that will not cause damage or injury, namely second object types 20b (such grass or weeds 46), the detector rods 78 of the contact detection device 50 will merely push over or move the second object types 20b out of the way, which will allow the motor vehicle 14 to continue along the direction of travel DOT without stopping. If the motor vehicle 14 does run over the second object types 20b, there will not be any damage or injury. If the object 20 is of the first object type 20a, however, contact by the detector rods 78 against the first object type 20a will cause the motor vehicle 14 to stop before it collides with the first object type 20a, thereby avoiding any damage or injury that could have otherwise occurred. As set forth above, the determination of what is a first object type 20a that should not be hit or run over and what is a second object type 20b that can be hit or run over is mechanically determined based on the amount of force necessary to overcome the biasing force of the biasing mechanism 90 (i.e., spring 108). As will be readily appreciated by persons skilled in the art, this is a much more direct and sure manner of determining if there are objects 20 in the path 16 of the motor vehicle 14 that should not be hit or run over (i.e., the first object types 20a) relative to prior art systems that rely on an algorithm learning what is safe to hit or run over and what is not or on prior art apparatuses and systems that allow the collision but attempt to reduce or minimize damage by absorbing the impact force of the collision. Therefore, the bumper apparatus 10 of the present invention is much safer and less likely to cause costly damage and equipment downtime than the prior art apparatuses and systems. This benefit is particularly important for use in agricultural area 30 where the motor vehicles 14 tend to be very large and heavy (i.e., tractors, harvesting machines, sprayers and the like) and the potential for expensive damage to the infrastructure is high and the downtime associated with repairs is costly.

When one or more of the detector rods 78 of the contact detection device 50 of the bumper apparatus 10 on a motor vehicle 14 makes contact with an object 20 that is of the first object type 20a, the force from the contact with the first object type 20a will be sufficient to overcome the static friction of the components of the bumper apparatus 10 and the biasing force of the spring 108 of the biasing mechanism 90. In response to the force resulting from hitting the first object type 20a, the pivoting mechanism 80 associated with the detector rod 78a/78b will allow the detector rod 78a/78b to pivot inward toward the motor vehicle 14, as shown with regard to FIGS. 8 and 9. The bump stop 82 will control the amount of pivoting and allow the pivoting detector rod 78a/78b to push the respective indicator rod 84a/84b inward toward the motor vehicle 14. When the indicator rod 84a/84b moves inward, it will slide relative to the rod supports 86 which hold the indicator rod 84a/84b adjacent a frame member 66 of the support frame 48 of the bumper apparatus 10, in the embodiment of bumper apparatus 10 shown in the figures, to direct the indicator rod 84a/84b inward (rearward for a forwardly positioned bumper apparatus 10), as shown with regard to FIGS. 11 and 12. The inward movement of the indicator rod 78a/78b will push the support plate 104 inward (rearward) to separate it from the first/proximal end 54 of the support apparatus 10, moving the switching mechanism 88 from its closed position 94 to its open position 92, as shown in FIGS. 11 and 12. This separation will move the magnet 103 away from the reed switch 101 to magnetically disengage the magnet 103 from the reed switch 101, which will send a signal via wires 102 (or other communicating means) to the motor vehicle 14 to cause the motor vehicle 14 to stop. As long as the first object type 20a is against the detector rods 78a/78b of the contact detection device 50, the biasing force of the biasing mechanism will be overcome and the support plate 104 will be in spaced apart relation to the first/proximal end 54 of the bumper apparatus 10 and the motor vehicle 14 will not be allowed to move in the desired direction of travel DOT along the path 16. Once the first object type 20a is no longer in contact with the indicator rods 84, either by being removed or moving the motor vehicle 14 such that the first object type 20a will no longer be in its path 16, the biasing force of the biasing mechanism 90 (i.e., spring 108) will push the indicator rods 84a/84b and the detector rods 78a/78b connected thereto outward away from the motor vehicle 14 (i.e., forwardly in the figures) and pull the support plate 104 back against the first/proximal end 54 of the support apparatus 10 to again place the switching mechanism 88 back in its closed position 92, which will allow the motor vehicle 14 to move along path 16 in the desired direction of travel DOT. In the configuration described above, pulling the support plate 104 back against the first/proximal end 54 of the support apparatus 10 will place the magnet 103 back in magnetic engagement with the reed switch 101. The motor vehicle 14 can then continue on the path 16 to accomplish the desired objectives for moving motor vehicle 14.

Figure 13:
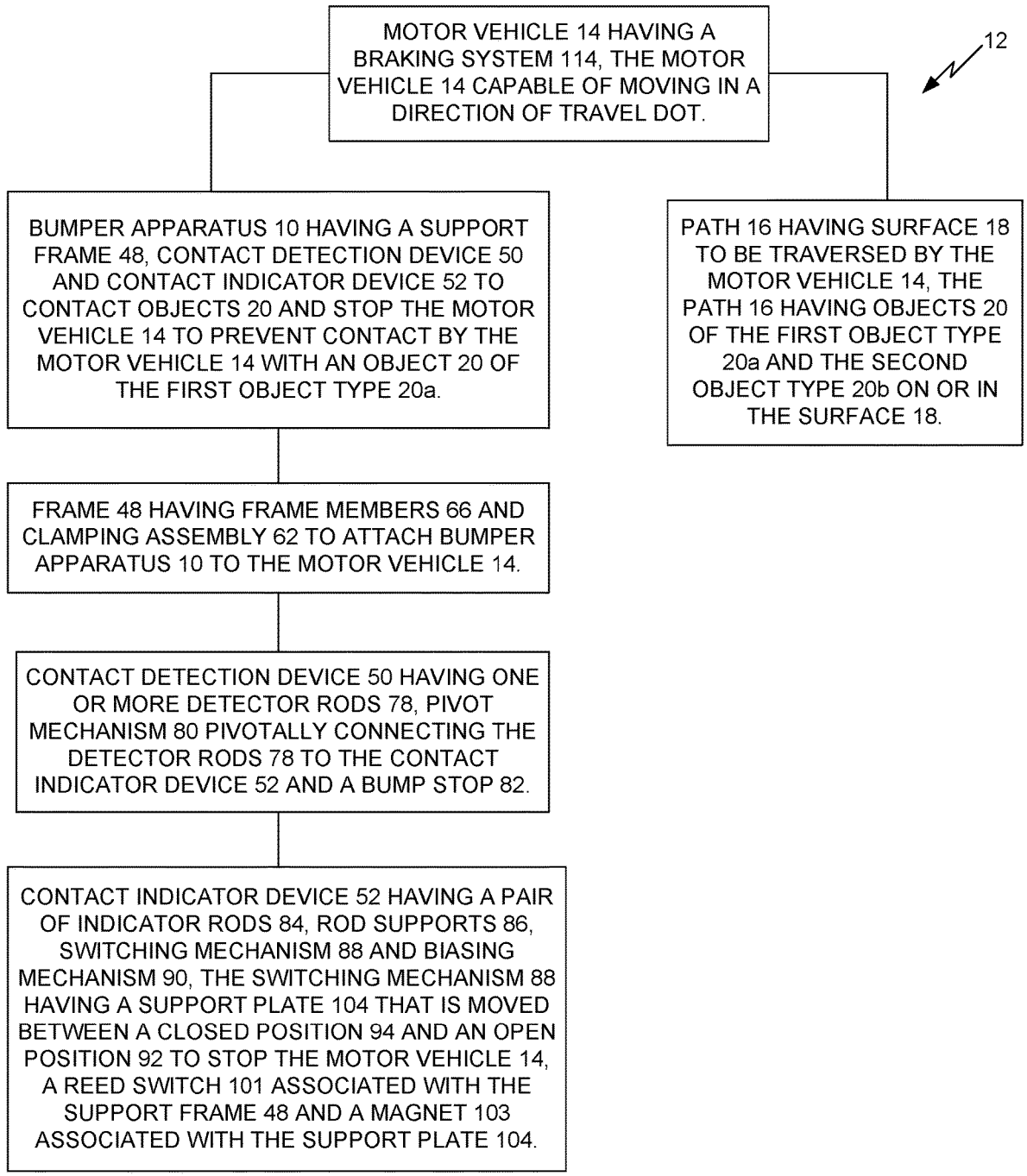
FIG. 13 is a chart showing object collision detection and avoidance apparatus system configured according to one of the preferred embodiments of the present invention.

When the switching mechanism 88 is moved to its open position 92, the disengagement of the reed switch 101 will send an electrical signal via the wires 102 to an actuator device 112 that will cause it to actuate and engage the braking system 114 of the motor vehicle 14, as shown in FIGS. 1 and 13. A wide range of actuators can be utilized as actuator device 112, such as those which are electrically actuated, hydraulically actuated, pneumatically actuated or the like. In other circumstances, the support plate 104 can be mechanically connected to a mechanically actuated actuator device 112 that will engage the braking system 114 of the motor vehicle 14. In any configuration, the actuator device 112 should be structured and arranged to quickly (nearly instantaneously) engage the braking system 114 so the motor vehicle 14 can be brought to a stop before the motor vehicle 14 hits or runs over the object 20 that is a first object type 20a. The use and configuration of such actuator devices 112 are well known to persons who are skilled in the relevant art.

As will be readily appreciated by persons skilled in the art, a number of modifications to the bumper apparatus 10 described above can be made and still accomplish the objectives of the present invention. For instance, a wide variety of different materials can be utilized for the various components of the bumper apparatus 10. Although metals are likely to be the preferred material, some or all of the components can be made out of fiberglass and other composites, hard plastics, hard rubber, wood and the like. In addition, the term "rod" or "rods" is not intended to be limiting in any manner. For instance, the rods set forth above, such as the detector rods 78 and indicator rods 84, can be bars, tubes or like elongated members that have the desired characteristics for the bumper apparatus 10. In addition, the various plates, mounts, supports and the like can be configured in a wide range of manners and still accomplish the objectives of the present invention.

One potential significant use for the new bumper apparatus 10 of the present invention is with regard to use with an autonomous motor vehicle 14. As set forth above, current autonomous motor vehicles rely on an algorithm to scan in the direction of travel DOT (i.e., forwardly) to determine if there is an object 20 in the path 16 of the motor vehicle 14 which may be a damage problem for the motor vehicle 14 and/or the object 20 and/or an injury problem for occupants of the motor vehicle 14 and/or object 20. As well known, it is very difficult to develop algorithms that can cover all possible types of objects 20 that may be of the first object type 20a. As such, current autonomous motor vehicles have problems with hitting objects 20 they should not and stopping when they do not need to stop. Generally, relying entirely on impact absorbing technology is usually not an option for most autonomous motor vehicle uses as hitting an object 20 with the motor vehicle is considered not acceptable. The use of remote-controlled vehicles is also limited due to the need to have a human who constantly watches the movement of the motor vehicle and having to hope he or she is paying sufficient attention to avoid hitting an object. These problems with autonomous or remote-controlled vehicles are particularly an issue with use in the agricultural industry. However, the bumper apparatus 10 of the present invention solves these problems.

An example use of the bumper apparatus 10 of the present invention with an autonomous motor vehicle 14 in an agricultural area 30 is shown in FIGS. 1 and 2. In this embodiment, the motor vehicle 14 will be a tractor, harvesting machine, sprayer or a wide range of other useful agricultural vehicles, which may be used alone or while towing another useful machine. The motor vehicle 14 can have a variety of autonomous vehicle equipment, including various data gathering devices 116 (such as video camera, radar, LIDAR or the like), one or more control connecting devices 118 (such as GPS, satellite, cellular and the like), an on-board computer 120, an air compressor, hydraulic unit or like pressure unit 122 that operatively connects to the actuator device 112, as shown in FIGS. 1 and 2. In the embodiment shown in the figures, the data gathering devices 116 and control connecting devices 118 are mounted on a data support frame 124, having a variety of frame members 126, that raises these components above the plants 34 to improve the functions thereof. If desired, an additional fuel tank 128 can be mounted on the upper section 72 of the support frame 48 of the bumper apparatus 10, as shown in FIGS. 1 and 2, to allow the autonomous motor vehicle 14 to operate independently for longer periods of time. As the autonomous motor vehicle 14 moves through the agricultural area 30, the bumper apparatus 10 can be relied upon to stop the motor vehicle 14 in sufficient time to avoid damage or injury if the bumper apparatus 10 contacts an object 20 that is of the first object type 20a and to not stop the motor vehicle 14 (i.e., allow it to continue in the direction of travel DOT along path 16) if the object 20 is of the second object type 20b. The data gathering devices 116 and control connecting devices 118 can be utilized by a remotely located person to check on a stopped motor vehicle 14 and allow him or her to determine what action is necessary to either move the first object type 20a out of the away or to move the motor vehicle 14 in a manner that allows the bumper apparatus 10 and motor vehicle 14 to avoid the first object type 20a. As will be readily appreciated by persons in the agricultural industry, use of the new bumper apparatus 10 in conjunction with an autonomous motor vehicle 14 can greatly reduce the cost and improve the efficiency of agricultural production.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A bumper apparatus for use with a motor vehicle configured to move along a path having a surface on which there are one or more objects which may be contacted by the motor vehicle, said bumper apparatus comprising:

a support frame having one or more frame members that define a first end and a second end of said support frame, said first end of said support frame defining a proximal end of said bumper apparatus, said proximal end of said bumper apparatus structured and arranged to be integral with or attached to the motor vehicle so as to be positioned with said second end thereof disposed in a direction of travel of the motor vehicle;

a contact indicator device having a first indicator rod and a second indicator rod in spaced apart, parallel relation to each other, one or more rod supports associated with each of said first indicator rod and said second indicator rod and a switching mechanism associated with each of said first indicator rod and said second indicator rod, said rod supports attached to or integral with said support frame and configured to slidably support one of said first indicator rod and said second indicator rod on or near a first side and the other of said first indicator rod and said second indicator rod on or near a second side of said bumper apparatus and extend each of said first indicator rod and said second indicator rod outward from the motor vehicle in the direction of travel of the motor vehicle, said switching mechanism structured and arranged to move between a closed position and an open position in response to sliding movement of at least one of said first indicator rod and said second indicator rod, said switching mechanism operatively connected to the motor vehicle so as to stop the motor vehicle from moving in the direction of travel when said switching mechanism is placed in one of said closed position and said open position, said contact indicator device structured and arranged to determine if an object is a first type object that the motor vehicle should not contact or a second type object that can be contacted by the motor vehicle so as to stop the motor vehicle if the object is the first object type and allow movement of the motor vehicle in the direction of travel if the object is the second object type; and a contact detection device having an elongated first detector rod and an elongated second detector rod, each of said elongated first detector rod and said elongated second detector rod structured and arranged to contact the object, each of said elongated detector rods positioned transverse to the direction of travel of the motor vehicle, said elongated first detector rod attached to said first indicator rod and said elongated second detector rod attached to said second indicator rod so as to position each of said elongated first detector rod and said elongated second detector rod in spaced apart relation to said second end of said support frame and to the motor vehicle in the direction of travel of the motor vehicle so each of said elongated first detector rod and said elongated second detector rod will contact the object sufficiently prior to the motor vehicle so as to allow said switching mechanism to stop the motor vehicle prior to the motor vehicle contacting the object if the object is the first type object.

2. The bumper apparatus of claim 1 further comprising a means for securely clamping said support frame of said bumper apparatus onto the motor vehicle so as to extend said distal end of support frame outward from the motor vehicle in the direction of travel of the motor vehicle.

3. The bumper apparatus of claim 2, wherein said clamping means is structured and arranged to clamp said support frame of said bumper apparatus onto a bumper of the motor vehicle.

4. The bumper apparatus of claim 1, wherein said rod supports and said switching mechanism are attached to or integral with a lower section of said support frame so as to dispose each of said first indicator rod and said second indicator rod generally outward from said lower section of said support frame.

5. The bumper apparatus of claim 1, wherein said switching mechanism is configured to stop the motor vehicle when placed in said open position, said switching mechanism comprising a support plate attached to or integral with each of said first indicator rod and said second indicator rod at or near said proximal end of said bumper apparatus, said support plate configured to be moved in spaced apart relation to said proximal end of said apparatus by sliding movement of one of said first indicator rod and said second indicator rod so as to place said switching mechanism in said open position and stop the motor vehicle.

6. The bumper apparatus of claim 1, wherein said contact indicator device further comprises a biasing means operatively connected to said switching mechanism for biasing said switching mechanism between one of said open position and said closed position.

7. The bumper apparatus of claim 6, wherein said biasing means is a spring connected to a bracket attached to or integral with said support frame so as to bias said switching mechanism between said open position and said closed position.

8. The bumper apparatus of claim 6, wherein said biasing means is structured and arranged to bias said switching mechanism in said closed position to allow movement of the motor vehicle when said bumper apparatus contacts the second type of object and to allow said switching mechanism to move to said open position when said bumper apparatus contacts the first type of object so as to stop the motor vehicle.

9. The bumper apparatus of claim 1, wherein each of said first detector rod and said second detector rod of said contact detection device are pivotally attached to said first indicator rod and said second indicator rod.

10. The bumper apparatus of claim 1, wherein said first detector rod and said second detector rod of said contact detection device are axially aligned, said first detector rod attached to or integral with said first indicator rod so as to slidably move said first indicator rod if said first detector rod contacts the first object type so as to engage said switching mechanism and stop the motor vehicle, said second detector rod attached to or integral with said second indicator rod so as to slidably move said second indicator rod if said second detector rod contacts the first object type so as to engage said switching mechanism and stop the motor vehicle.

11. The bumper apparatus of claim 10 further comprising a pivoting mechanism interconnecting said first detector rod and said first indicator rod so as to allow said first detector rod to pivot relative to said first indicator rod upon contact with the first object type and a pivoting mechanism interconnecting said second detector rod and said second indicator rod so as to allow said second detector rod to pivot relative to said second indicator rod upon contact with the first object type.

12. The bumper apparatus of claim 11 further comprising a bump stop associated with each of said first detector rod and said second detector rod, said bump stop comprising a rod mount attached to or integral with said first detector rod, a rod mount attached to or integral with said second detector rod and a connecting rod interconnecting said rod mount of said first detector rod and said rod mount of said second detector rod so as to direct each of said first indicator rod and said second indicator rod toward the motor vehicle.

13. The bumper apparatus of claim 1, wherein said switching mechanism is connected to an actuator device operatively connected to a braking system of the motor vehicle so as to activate the braking system and stop the motor vehicle when said bumper apparatus contacts the first object type.

14. The bumper apparatus of claim 13, wherein the motor vehicle has one or more data gathering devices, one or more control connecting devices and a computer operatively connected to each of said data gathering devices and said control connecting devices to allow the motor vehicle to be autonomously operated.

15. A bumper apparatus for use with a motor vehicle configured to move along a path having a surface on which there are one or more objects which may be contacted by the motor vehicle, said bumper apparatus comprising:
a support frame having one or more frame members that define a first end and a second end of said support frame, said first end of said support frame defining a proximal end of said bumper apparatus, said proximal end of said bumper apparatus structured and arranged to be integral with or attached to the motor vehicle so as to extend outward from the motor vehicle with said second end of said support frame disposed in a direction of travel of the motor vehicle;
a contact indicator device having a first indicator rod and a second indicator rod in spaced apart, parallel relation to each other, one or more rod supports associated with each of said first indicator rod and said second indicator rod, a switching mechanism associated with each of said first indicator rod and said second indicator rod, and a biasing mechanism associated with each of said switching mechanisms, said rod supports attached to or integral with said support frame and configured to slidably support said first indicator rod on or near a first side of said bumper apparatus and said second indicator rod on or near a second side of said bumper apparatus and extend each of said first indicator rod and said second indicator rod outward from the second end of said support frame in the direction of travel of the motor vehicle, said switching mechanism structured and arranged to move from a closed position to an open position in response to sliding movement of one of said first indicator rod and said second indicator rod, said switching mechanism operatively connected to a braking system of the motor vehicle to stop the motor vehicle from moving in the direction of travel when said switching mechanism is placed in said open position, said biasing mechanism structured and arranged to bias said switching mechanism in said closed position to allow movement of the motor vehicle, said contact indicator device structured and arranged to determine if an object is a first type object that the motor vehicle should not contact or a second type object that can be contacted by the motor vehicle so as to stop the motor vehicle if the object is the first object type and allow movement of the motor vehicle in the direction of travel if the object is the second object type; and
a contact detection device having an elongated first detector rod and an elongated second detector rod which are structured and arranged to contact the object, each of said elongated said first detector rod and said elongated second detector rod being positioned transverse to the direction of travel of the motor vehicle and pivotally attached to, respectively, said first indicator rod and said second indicator rod so as to position each of said elongated first detector rod and said elongated second detector rod in spaced apart relation to said second end of said support frame and to the motor vehicle in the direction of travel of the motor vehicle so at least one of said elongated first detector rod and said elongated second detector rod will contact the object sufficiently prior to the motor vehicle to allow said switching mechanism to stop the motor vehicle prior to the motor vehicle contacting the object if the object is the first type object, wherein said contact indicator device and said contact detection device are cooperatively configured for at least one of said elongated first detector rod and said elongated second detector rod to pivot toward the motor vehicle upon contact with a first object type so as to slide at least one of said first indicator rod and said second indicator rod toward the motor vehicle and overcome the biasing force of said biasing mechanism to move said switching mechanism to said open position so as to engage said braking system of the motor vehicle and stop the motor vehicle prior to the motor vehicle contacting the first object type.

16. The bumper apparatus of claim 15 further comprising a means for securely clamping said support frame of said bumper apparatus onto a bumper of the motor vehicle so as to extend said distal end of support frame outward from the bumper of the motor vehicle in the direction of travel of the motor vehicle to prevent contact between the first object type and the bumper.

17. The bumper apparatus of claim 15, wherein said elongated first detector rod and said elongated second detector rod of said contact detection device are axially aligned, said elongated first detector rod attached to or integral with said first indicator rod so as to slidably move said first indicator rod if said first detector rod contacts the first object type so as to engage said switching mechanism and stop the motor vehicle, said elongated second detector rod attached to or integral with said second indicator rod so as to slidably move said second indicator rod if said elongated second detector rod contacts the first object type so as to engage said switching mechanism and stop the motor vehicle.

18. The bumper apparatus of claim 17 further comprising a bump stop associated with each of said elongated first detector rod and said elongated second detector rod, said bump stop comprising a rod mount attached to or integral with said elongated first detector rod, a rod mount attached to or integral with said elongated second detector rod and a connecting rod interconnecting said rod mount of said elongated first detector rod and said rod mount of said elongated second detector rod so as to direct each of said first indicator rod and said second indicator rod toward the motor vehicle.

19. A bumper apparatus for use with a motor vehicle configured to move along a path having a surface on which there are one or more objects which may be contacted by the motor vehicle, said bumper apparatus comprising:
  a support frame having one or more frame members that define a first end and a second end of said support frame, said first end of said support frame defining a proximal end of said bumper apparatus, said proximal end of said bumper apparatus structured and arranged to be attached to the motor vehicle so as to extend outwardly from the motor vehicle with said second end of said support frame disposed in a direction of travel of the motor vehicle;
  a contact indicator device having a first indicator rod and a second indicator rod in spaced apart, parallel relation to each other, one or more rod supports associated with each of said first indicator rod and said second indicator rod, a switching mechanism associated with each of said first indicator rod and said second indicator rod and a spring associated with each of said switching mechanisms, said rod supports attached to or integral with said support frame and configured to slidably support one said first indicator rod and said second indicator rod on or near a first side of said bumper apparatus and the other of said first indicator rod and said second indicator rod on or near a second side of said bumper apparatus and extend each of said first indicator rod and said second indicator rod outward from the second end of said support frame in the direction of travel of the motor vehicle, said switching mechanism having a support plate attached to each of said first indicator rod and said second indicator rod at said proximal end of said bumper apparatus, said switching mechanism configured to move from a closed position with said support plate at said proximal end of said bumper apparatus to an open position with said support plate in spaced apart relation to said proximal end of said bumper apparatus in response to sliding movement of at least one of said first indicator rod and said second indicator rod, said switching mechanism operatively connected to a braking system of the motor vehicle to stop the motor vehicle from moving in the direction of travel when said switching mechanism is placed in said open position, said spring interconnecting said support plate and a bracket attached to or integral with said support frame, said spring structured and arranged to bias said switching mechanism in said closed position so as to allow movement of the motor vehicle, said contact indicator device structured and arranged to overcome the biasing force of said spring and move said support plate to place said switching mechanism in said open position if the object is a first type object that the motor vehicle should not contact and to not overcome the biasing force of said spring if the object is a second type object that can be contacted by the motor vehicle so as to stop the motor vehicle if the object is the first object type and allow movement of the motor vehicle in the direction of travel if the object is the second object type; and
  a contact detection device having a elongated first detector rod and a second elongated detector rod, each of said elongated first detector rod and said elongated second detector rod structured and arranged to contact the object, each of said elongated detector rods positioned transverse to the direction of travel of the motor vehicle, said first detector rod pivotally attached to said first indicator rod and said second detector rod pivotally attached to said second indicator rod so as to position each of said elongated first detector rod and said elongated second detector rod in spaced apart relation to said second end of said support frame and to the motor vehicle in the direction of travel of the motor vehicle so each of said elongated first detector rod and said elongated second detector rod will contact the object sufficiently prior to the motor vehicle to allow said switching mechanism to stop the motor vehicle prior to the motor vehicle contacting the object if the object is the first type object,
  wherein said contact indicator device and said contact detection device are cooperatively configured for one of said elongated first detector rod and said elongated second detector rod to pivot toward the motor vehicle upon contact with the first object type so as to slide the respective first indicator rod or second indicator rod toward the motor vehicle and overcome the biasing force of said spring to move said switching mechanism to said open position and engage said braking system of the motor vehicle to stop the motor vehicle prior to the motor vehicle contacting the first object type.

20. The bumper apparatus of claim 19 further comprising a bump stop associated with each of said elongated first detector rod and said elongated second detector rod, said bump stop comprising at least one rod mount attached to or integral with each of said elongated first detector rod and said elongated second detector rod and a connecting rod interconnecting said rod mounts so as to force each of said elongated first detector rod and said elongated second detector rod to respectively direct at least one of said first indicator rod and said second indicator rod toward the motor vehicle.

* * * * *